United States Patent
Silverstein et al.

(10) Patent No.: US 11,401,386 B2
(45) Date of Patent: Aug. 2, 2022

(54) DOUBLY-CROSSLINKED, EMULSION-TEMPLATED HYDROGELS THROUGH REVERSIBLE METAL COORDINATION

(71) Applicant: Technion Research & Development Foundation Limited, Haifa (IL)

(72) Inventors: Michael S. Silverstein, Zikhron-Yaakov (IL); Tao Zhang, Nesher (IL)

(73) Assignee: Technion Research & Development Foundation Limited, Haifa (IL)

( * ) Notice: Subject to any disclaimer, the term of this patent is extended or adjusted under 35 U.S.C. 154(b) by 108 days.

(21) Appl. No.: 16/747,575

(22) Filed: Jan. 21, 2020

(65) Prior Publication Data
US 2020/0148837 A1    May 14, 2020

Related U.S. Application Data

(63) Continuation of application No. PCT/IL2018/050803, filed on Jul. 19, 2018.

(60) Provisional application No. 62/534,311, filed on Jul. 19, 2017.

(51) Int. Cl.
*C08J 3/075* (2006.01)
*C08J 3/24* (2006.01)

(52) U.S. Cl.
CPC .................. *C08J 3/075* (2013.01); *C08J 3/24* (2013.01); *C08J 2333/26* (2013.01)

(58) Field of Classification Search
CPC ..................................................... C08J 3/075
See application file for complete search history.

(56) References Cited

U.S. PATENT DOCUMENTS

| | | |
|---|---|---|
| 2,801,185 A | 7/1957 | Iler |
| 3,417,171 A | 12/1968 | Eberle et al. |
| 4,455,205 A | 6/1984 | Olson et al. |
| 4,478,876 A | 10/1984 | Chung |
| 4,486,504 A | 12/1984 | Chung |
| 4,491,508 A | 1/1985 | Olson et al. |
| 4,522,958 A | 6/1985 | Das et al. |
| 5,258,225 A | 11/1993 | Katsamberis |
| 5,648,407 A | 7/1997 | Goetz et al. |
| 5,652,194 A | 7/1997 | Dyer et al. |
| 6,147,131 A | 11/2000 | Mork et al. |

(Continued)

FOREIGN PATENT DOCUMENTS

| | | |
|---|---|---|
| CA | 2322498 | 9/1999 |
| CN | 107126936 | 9/2017 |

(Continued)

OTHER PUBLICATIONS

Yi, W.; Wu, H.; Wang, H.; Du, Q. Langmuir 2016, 32, 982-990. (Year: 2016).*

(Continued)

*Primary Examiner* — Michael F Pepitone

(57) ABSTRACT

Doubly-crosslinked hydrogel polyHIPEs (DC-PHs), which exhibit rapid water absorption, enhanced mechanical properties, and shape memory behavior, are provided herein, as well as processes of producing the same and uses thereof. DC-PHs comprise a continuous HIPE-templated doubly-crosslinked hydrogel, formed from hydrogel-forming monomers, ligand-bearing monomers, and crosslinking monomers.

15 Claims, 15 Drawing Sheets

(56) References Cited

U.S. PATENT DOCUMENTS

| | | | |
|---|---|---|---|
| 6,204,298 | B1 | 3/2001 | DesMarais et al. |
| 6,241,713 | B1 | 6/2001 | Gross et al. |
| 6,353,037 | B1 | 3/2002 | Thunhorst et al. |
| 6,573,305 | B1 | 6/2003 | Thunhorst et al. |
| 6,586,483 | B2 | 7/2003 | Kolb et al. |
| 7,129,277 | B2 | 10/2006 | Baran, Jr. |
| 7,189,768 | B2 | 3/2007 | Baran, Jr. et al. |
| 7,507,780 | B2 | 3/2009 | Hagerty et al. |
| 7,967,367 | B2 | 6/2011 | Cafeo et al. |
| 10,449,516 | B2 | 10/2019 | Kovacic et al. |
| 2002/0091368 | A1 | 7/2002 | LaVon et al. |
| 2003/0097103 | A1 | 5/2003 | Horney et al. |
| 2003/0170308 | A1 | 9/2003 | Cleary et al. |
| 2004/0116594 | A1 | 6/2004 | Bhattacharjee et al. |
| 2004/0204510 | A1 | 10/2004 | Clear et al. |
| 2004/0224021 | A1 | 11/2004 | Omidian et al. |
| 2005/0215962 | A1 | 9/2005 | Litvay et al. |
| 2009/0215913 | A1 | 8/2009 | Thies et al. |
| 2009/0270538 | A1 | 10/2009 | Ikeuchi et al. |
| 2011/0091512 | A1 | 4/2011 | Li |
| 2012/0201806 | A1 | 8/2012 | Silverstein et al. |
| 2012/0261803 | A1 | 10/2012 | Bismarck et al. |
| 2013/0324627 | A1 | 12/2013 | Silverstein et al. |
| 2014/0011897 | A1 | 1/2014 | Friederichs et al. |
| 2014/0328884 | A1 | 11/2014 | Reyes et al. |
| 2015/0166753 | A1 | 6/2015 | Silverstein et al. |
| 2016/0287516 | A1 | 10/2016 | Cosgriff-Hernandez et al. |
| 2016/0361382 | A1 | 12/2016 | Steinbach-Rankins et al. |
| 2017/0189238 | A1 | 7/2017 | Andrews |
| 2017/0326529 | A1 | 11/2017 | Kovacic et al. |
| 2019/0031845 | A1 | 1/2019 | Kitayama et al. |
| 2019/0127546 | A1 | 5/2019 | Silverstein et al. |
| 2019/0194083 | A1 | 6/2019 | Silverstein et al. |
| 2020/0016574 | A1 | 1/2020 | Kovacic et al. |
| 2020/0123338 | A1 | 4/2020 | Silverstein et al. |
| 2020/0277450 | A1 | 9/2020 | Silverstein et al. |

FOREIGN PATENT DOCUMENTS

| | | |
|---|---|---|
| WO | WO 94/12134 | 6/1994 |
| WO | WO 02/008321 | 1/2002 |
| WO | WO 2009/013500 | 1/2009 |
| WO | WO 2015/076908 | 5/2015 |
| WO | WO 2018/002916 | 1/2018 |
| WO | WO 2018/002916 A8 | 1/2018 |
| WO | WO 2018/033913 | 2/2018 |
| WO | WO 2018/033913 A8 | 2/2018 |
| WO | WO 2019/012529 | 1/2019 |
| WO | WO 2019/016816 | 1/2019 |
| WO | WO 2019/016816 A9 | 5/2019 |
| WO | WO 2019/087185 | 5/2019 |

OTHER PUBLICATIONS

Restriction Official Action dated Apr. 7, 2020 from the US Patent and Trademark Office Re. U.S. Appl. No. 16/231,627. (10 pages).
David et al. "Porous Polyurethanes Synthesized within High Internal Phase Emulsions", Journal of Polymer Science: Part A: Polymer Chemistry, 2002(23): 5806-5814, 2009.
Restriction Official Action dated Feb. 12, 2014 From the US Patent and Trademark Office Re. U.S. Appl. No. 13/892,606.
Official Action dated Jun. 29, 2020 from the US Patent and Trademark Office Re. U.S. Appl. No. 16/579,942. (26 pages).
Interview Summary dated Jul. 23, 2021 from the US Paten Re. U.S. Appl. No. 16/325,401. (3 ages).
Official Action dated Apr. 9, 2021 From the US Patent and Trademark Office Re. U.S. Appl. No. 16/325,401. (37 Pages).
International Preliminary Report on Patentability dated Jan. 10, 2019 From the International Bureau of WIPO Re. Application No. PCT/IL2017/050706. (10 Pages).
International Preliminary Report on Patentability dated Jan. 23, 20120 From the International Bureau of WIPO Re. Application No. PCT/IL2018/050751. (10 Pages).
International Preliminary Report on Patentability dated Feb. 28, 2019 From the International Bureau of WIPO Re. Application No. PCT/IL2017/050904. (8 Pages).
International Preliminary Report on Patentability dated Jan. 30, 2020 From the International Bureau of WIPO Re. Application No. PCT/IL2018/050803. (7 Pages).
International Search Report and the Written Opinion dated Nov. 1, 2018 From the International Searching Authority Re. Application No. PCT/IL2018/050803. (11 Pages).
International Search Report and the Written Opinion dated Nov. 12, 2017 From the International Searching Authority Re. Application No. PCT/IL2017/050904. (13 Pages).
International Search Report and the Written Opinion dated Nov. 20, 2018 From the International Searching Authority Re. Application No. PCT/IL2018/050751. (15 Pages).
International Search Report and the Written Opinion dated Jan. 27, 2019 From the International Searching Authority Re. Application No. PCT/IL2018/051158. (12 Pages).
International Search Report and the Written Opinion dated Sep. 27, 2017 From the International Searching Authority Re. Application No. PCT/IL2017/050706. (17 Pages).
Notice of Omitted Item(s) in a Nonprovisional Application dated Jan. 8, 2015 From the US Patent and Trademark Office Re. U.S. Appl. No. 14/578,519.
Office Action and Search Report dated Mar. 1, 2017 From the Israel Patent Office Re. Application No. 247302. (7 Pages).
Office Action and Search Report dated Dec. 4, 2016 From the Israel Patent Office Re. Application No. 245656. (7 Pages).
Office Action and Search Report dated Sep. 5, 2018 From the Israel Patent Office Re. Application No. 256783. (14 Pages).
Office Action and Search Report dated Mar. 11, 2018 From the Israel Patent Office Re. Application No. 255404. (7 Pages).
Office Action and Search Report dated Mar. 16, 2017 From the Israel Patent Office Re. Application No. 246468. (8 Pages).
Office Action dated Sep. 7, 2017 From the Israel Patent Office Re. Application No. 247302 and Its Translation Into English. (12 Pages).
Office Action dated Feb. 8, 2018 From the Israeli Patent Office Re. Application No. 247302 and Its Translation Into English. (11 Pages).
Office Action dated Jul. 16, 2017 From the Israel Patent Office Re. Application No. 245656 and Its Translation Into English. (4 Pages).
Office Action dated Nov. 16, 2016 From the Israel Patent Office Re. Application No. 246468. (2 Pages).
Office Action dated Jun. 21, 2016 From the Israel Patent Office Re. Application No. 245656. (3 Pages).
Office Action dated May 23, 2016 From the Israel Patent Office Re. Application No. 245656. (2 Pages).
Office Action dated Sep. 25, 2016 From the Israel Patent Office Re. Application No. 247302. (1 Page).
Office Action dated Dec. 28, 2017 From the Israel Patent Office Re. Application No. 253431. (4 Pages).
Office Action dated Sep. 28, 2017 From the Israel Patent Office Re. Application No. 246468 and Its Translation Into English. (6 Pages).
Office Action dated Aug. 30, 2018 From the Israel Patent Office Re. Application No. 247302 and Its Translation Into English. (13 Pages).
Office Action dated Feb. 8, 2018 From the Israel Patent Office Re. Application No. 246468 and Its Translation Into English. (4 Pages).
Official Action dated Sep. 5, 2014 From the US Patent and Trademark Office Re. U.S. Appl. No. 13/369,362.
Official Action dated Oct. 6, 2015 From the US Patent and Trademark Office Re. U.S. Appl. No. 14/578,519.
Official Action dated May 13, 2014 From the US Patent and Trademark Office Re. U.S. Appl. No. 13/892,606.
Official Action dated Nov. 20, 2018 From the US Patent and Trademark Office Re. U.S. Appl. No. 15/595,970. (38 Pages).
Supplementary European Search Report and the European Search Opinion dated Jan. 22, 2020 From the European Patent Office Re. Application No. 17819486.6. (11 Pages).
Audouin et al. "Preparation, Solid-State NMR, and Physicochemical Characterization of Surprisingly Tough Open Cell PolyHIPEs

(56) References Cited

OTHER PUBLICATIONS

Derived From 1-Vinyl-1,2,4-Triazole Oil-in-Water Emulsions", Macromolecules, 44(12): 4879-4886, May 27, 2011.
Audouin et al. "Synthesis of Porous Materials by 2-Nitroresorcinol/ Cyanuric Chloride Thermal Polycondensation in Emulsions", Journal of Applied Polymer Science, 108(5): 280802813, Published Online Feb. 25, 2008.
Avraham "Liraz Avraham—Materials Engineer—GOI (Government of Israel)", LinkedIn, XP055657899, 6 P., Jan. 14, 2020.
Avraham et al. "Porous, Polysaccharide-Containing Poly(Urethane Urea) Monoliths Through Emulsion Templating", Department of Materials Science and Engineering, Technion—Israel Institute of Technology, XP055657891, 1 P., Dec. 31, 2015.
Barbetta et al. "High Internal Phase Emulsions (HIPEs) Containing Divinylbenzene and 4-Venylbenzyl Chloride and the Morphology of the Resulting PolyHIPE Materials", Chemical Communications, p. 221-222, 2000.
Chung et al. "The Thermoresponsive Shape Memory Characteristics of Polyurethane Foam", Journal of Applied Polymer Science, 117: 2265-2271, 2010.
Cohen Samoocha "Bicontinuous Hydrogel-Filled Hydrophobic Polymers Synthesized Within Polymer-Nanoparticle-Stabilized Pickering Emulsions", M.Sc Thesis, Department of Materials Science and Engineering, Abstract. Apr. 2015.
Colver et al. "Cellular Polymer Monoliths Made Via Pickering High Internal Phase Emulsions", Chemical Materials, 19: 1537-1539, 2007.
David et al. "Porous Polyurethanes Synthesized Within High Internal Phase Emulsions", Journal of Polymer Science Part A: Polymer Chemistry, XP055450683, 47(21): 5806-5814, Sep. 28, 2009. Abstract, Fig.3, p. 5807-5808, p. 5809, Line 2, 5813.
Deleuze et al. "Preparation and Functionalisation of Emulsion-Derived Microcellular Polymeric Foams (PolyHIPEs) by Ring-Opening Metathesis Polymerisation (ROMP)", Chemistry Communications, 2002(23): 2822-2823, Advance Publication Oct. 25, 2002.
Gitli et al. "Emulsion Templated Bicontinuous Hydrophobic-Hydrophilic Polymers: Loading and Release", Polymer, 52(1): 107-115, Available Online Nov. 13, 2010.
Gurevitch et al. "Nanoparticle-Based and Organic-Phase-Based AGET ATRP PolyHIPE Synthesis Within Pickering HIPEs and Surfactants-Stabilized HIPEs", Macromolecules, 44(9): 3398-3409, Apr. 15, 2011.
Gurevitch et al. "Polymerized Pickering HIPEs: Effects of Synthesis Parameters on Porous Structure", Journal of Polymer Science, Part A: Polymer Chemistry, 48: 1516-1525, 2010.
Ikem et al. "High Internal Phase Emulsions Stabilized Solely by Functionalized Silica Particles", Angewandte Chemie, International Edition, 47: 8277-8279, 2008.
Kabiri et al. "Novel Sulfobetaine-Sulfonic Acid-Contained Superswelling Hydrogels", Polymers for Advanced Technologies, 16(9): 659-666, Published Online Aug. 4, 2005.
Kapilov-Buchman et al. "Water-Filled Elastomers Through Droplet Microencapsulation: Release and Degradation", Department of Materials Science and Engineering, Technion—Israel Institute of Technology, Haifa, Israel, Poster, Dec. 31, 2015.
Kapilov-Buchman et al. "Water-Filled Elastomers Through Droplet Microencapsulation: Release and Degradation", Presentation in the Conference IMEC, BarIlan University, Israel, Feb. 1-2, 2016, 17 P., Feb. 2, 2016.
Kovacic et al. "Macroporous Double Network Hydrogels Through Emulsion Templating", Presented at the Polymer Chemistry Gordon Research Conference, Poster, Jun. 30, 2015.
Kovacic et al. "Superabsorbent, High Porosity, PAMPS?Based Hydrogels Through Emulsion Templating", Macromolecular Rapid Communications, 37(22): 1814-1819, Sep. 2016.
Lalani et al. "Electrospun Zwitterionic Poly(Sulfobetaine Methacrylate) for Nonadherent, Superabsorbent, and Antimicrobial Wound Dressing Applications", Biomacromolecules, 13(6): 1853-1863, Apr. 30, 2012.

Laschewsky "Structures and Synthesis of Zwitterionic Polymers", Polymers, 6(5): 1544-1601, May 23, 2014.
Luo et al. "One-Pot Interfacial Polymerization to Prepare PolyHIPEs With Functional Surface", Colloid and Polymer Science, 293(6): 1767-1779, Published Online Mar. 25, 2015.
Madhusudhana et al. "Bicontinuous Highly Cross-Linked Poly(Acrylamide-Co-Ethyleneglycol Dimethacrylate) Porous Materials Synthesized Within High Internal Phase Emulsions", Soft Matter, 7: 10780-10786, Sep. 28, 2011. p. 10781, Left col., Lines 11-15, PolyHIPES Synthesis Section, p. 10782, Left col., Lines 28-37, p. 10785, Right col., Lines 5-8, p. 10786, Left col., Lines 3-5.
Maji et al. "Dual-Stimuli-Responsive L-Serine-Based Zwitterionic UCST-Type Polymer With Tunable Thermosensitivity", Macromolecules, 48(14): 4957-4966, Jul. 20, 2015.
Menner et al. "High Internal Phase Emulsion Templates Solely Stabilised by Functionalised Titania Nanoparticles", Chemical Communications, p. 4274-4276, 2007.
Menner et al. "Particle-Stabilized Surfactant-Free Medium Internal Phase Emulsions as Templates for Porous Nanocomposite Materials: Poly-Pickering-Foams", Langmuir, 23: 2398-2403, 2007.
Mülhaupt "Catalytic Polymerization and Post Polymerization Catalysis Fifty Years After the Discover of Ziegler's Catalysts", Macromolecular Chemistry and Physics, 204(2): 289-327, Feb. 2003.
Oh et al. "Injectable, Interconnected, High-Porosity Macroporous Biocompatible Gelatin Scaffolds Made by Surfactant-Free Emulsion Templating", Macromolecular Rapid Communications. 36(4): 364-372, Published Online Dec. 10, 2014.
Silverstein "Emulsion-Templated Porous Polymers: A Retrospective Perspective", Polymer, 55(1): 304-320, Available Online Sep. 11, 2013. Abstract, p. 262, Lines 20-22, p. 271, Lines 23-35, p. 273, Lines 10-11, Table S-4.
Silverstein et al. "PolyHIPEs—Porous Polymers From High Internal Phase Emulsions", Encyclopedia of Polymer Science and Technology, p. 1-24, 2010.
Streifel et al. "Porosity Control in High Internal Phase Emulsion Templated Polyelectrolytes Via Ionic Crosslinking", Journal of Polymer Science, Part A: Polymer Chemistry, 54(16): 2486-2492, Published Online Apr. 13, 2016. Abstract, p. 1, col. 1, Lines 6-10.
Tan et al. "Synthesis and Aqueous Solution Properties of Sterically Stabilized PH-Responsive Polyampholyte Microgels", Journal of Colloid and Interface Science, 309: 453-463, Available Online Feb. 16, 2007.
Tobushi et al. "The Influence of Shape-Holding Conditions on Shape Recovery of Polyurethane-Shape Memory Polymer Foams", Smart Materials and Structures, 13: 881-887, 2005.
Unknown "Salt Solution-Filled Elastomeric Monoliths Through Templating Within Pickering Emulsions: Release and Degradation", 1 P., Jul. 2016.
Warwar Damouny et al. "Hydrogel-Filled, Semi-Crystalline, Nanoparticle-Crosslinked, Porous Polymers From Emulsion Templating: Structure, Properties, and Shape Memory", Polymer, XP029381315, 82: 262-273, Available Online Nov. 23, 2015.
Yakacki et al. "Strong, Tailored, Biocompatible Shape-Memory Polymer Networks", Advanced Functional Materials, 18(16): 2428-2435, Aug. 22, 2008.
Zhang et al. "Doubly-Crosslinked. Emulsion-Templated Hydrogels Through Reversible Metal Coordination", Polymer, 126: 386-394, Jul. 18, 2017. Esp. Sections 2.2-2.4, Section 3.9.
Zhang et al. "Highly Porous, Emulsion-Templated, Zwitterionic Hydrogels: Amplified and Accelerated Uptakes With Enhanced Environmental Sensitivity", Polymer Chemistry, 9(25): 3479-3487, Published Online May 21, 2018.
Zhang et al. "PMMA Based Foams Made Via Surfactant-Free High Internal Phase Emulsion Templates", Chemical Communications, p. 2217-2219, 2009.
Zheng et al. "Metal-Coordination Complexes Mediated Physical Hydrogels with High Toughness, Stick-Slip Tearing Behavior, and Good Processability", Macromolecules, 49(24), 9637-9646, Dec. 2016.

(56) References Cited

OTHER PUBLICATIONS

Zhou et al. "Ion-Responsive Alginate Based Macroporous Injectable Hydrogel Scaffolds Prepared by Emulsion Templating", Journal of Materials Chemistry B: Materials for Biology and Medicine, 1(37): 4736-4745, Oct. 7, 2013.

Zhu et al. "Monolithic Supermacroporous Hydrogel Prepared From High Internal Phase Emulsions (HIPEs) for Fast Removal of $Cu^{2+}$ and $Pb^{2+}$", Chemical Engineering Journal, 284: 422-430, Available Online Sep. 9, 2015.

Official Action dated Mar. 11, 2022 from US Patent and Trademark Office Re. U.S. Appl. No. 16/758,882. (29 pages).

Annabi et al. "Controlling the Porosity and Microarchitecture of Hydrogels for Tissue Engineering", Tissue Engineering Part B: Reviews, 16(4): 371-383, Mar. 17, 2010.

Official Action dated Oct. 20, 2021 from the US Patent and Trademark Office Re. U.S. Appl. No. 16/325,401. (15 pages).

\* cited by examiner

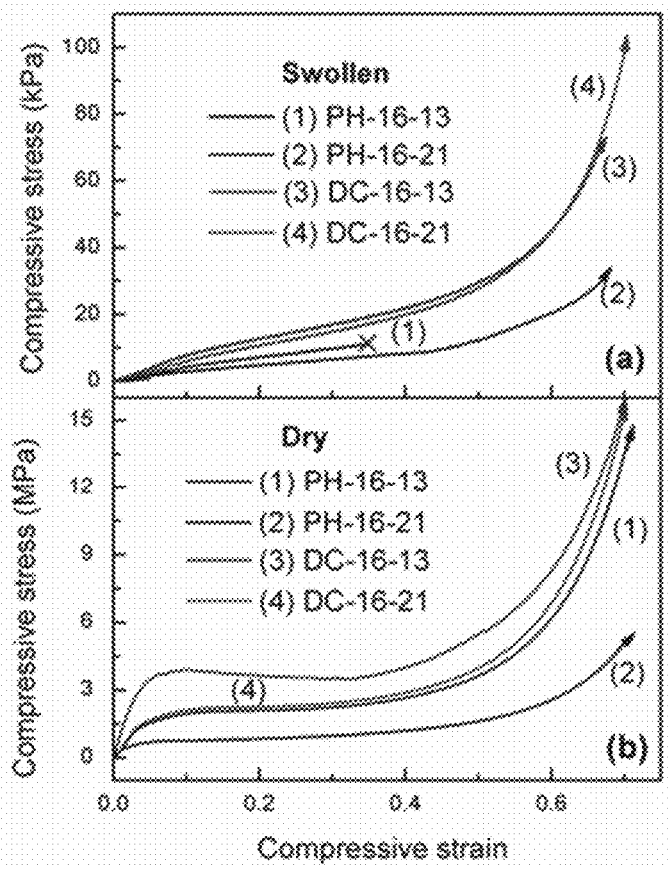
FIG. 4A
FIG. 4B
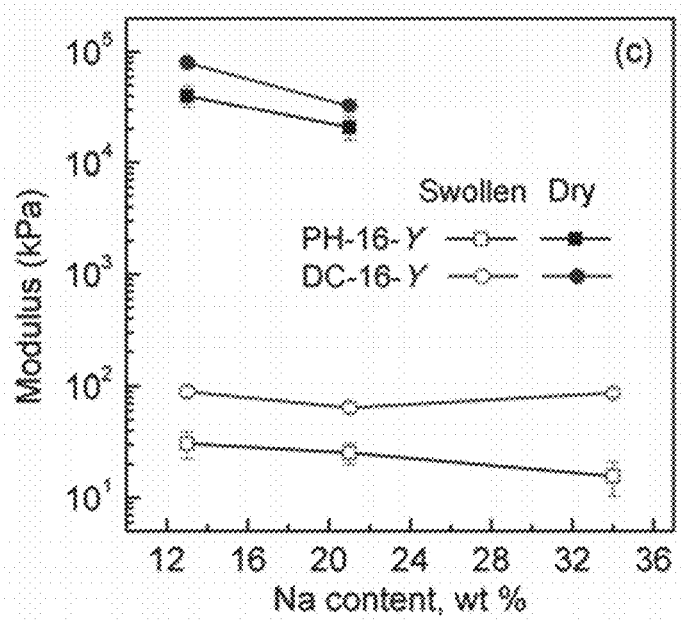
FIG. 4C

FIG. 5A  FIG. 5B  FIG. 5C  FIG. 5D
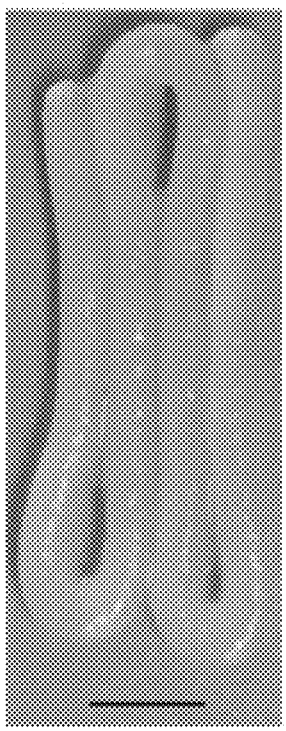 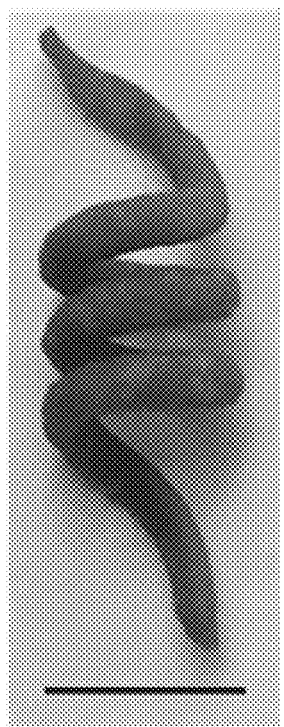 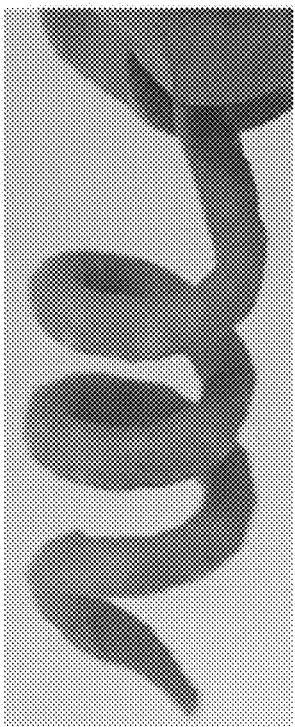 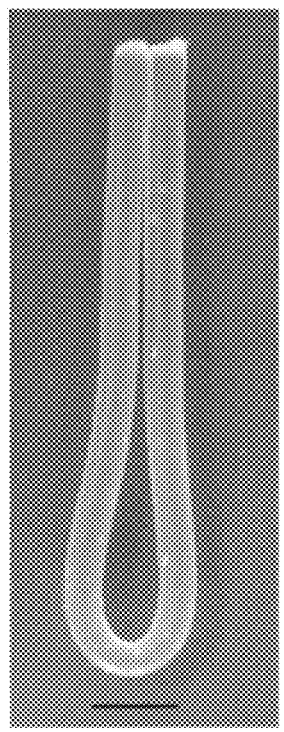
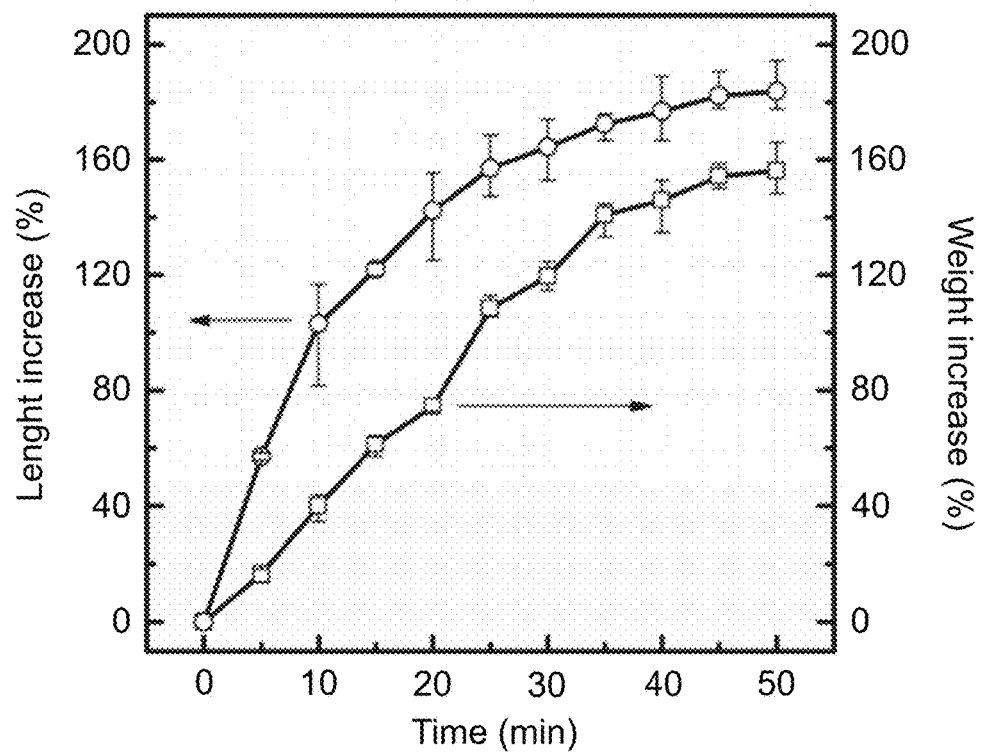
FIG. 5E

DOUBLY-CROSSLINKED, EMULSION-TEMPLATED HYDROGELS THROUGH REVERSIBLE METAL COORDINATION

RELATED APPLICATIONS

This application is a Continuation of PCT Patent Application No. PCT/IL2018/050803 filed on Jul. 19, 2018, which claims the benefit of priority under 35 USC § 119(e) of U.S. Provisional Patent Application No. 62/534,311 filed on Jul. 19, 2017. The contents of the above applications are all incorporated by reference as if fully set forth herein in their entirety.

FIELD AND BACKGROUND OF THE INVENTION

The present invention, in some embodiments thereof, relates to polyHIPEs, and more particularly, but not exclusively, to polyHIPEs that can switch reversibly from flexible to rigid.

PolyHIPEs (PH) are macroporous polymers polymerized within high internal phase emulsions (HIPEs), emulsions with a total internal dispersed phase volume fraction greater than 74% [1-3]. Hydrophilic polyHIPEs or hydrogel polyHIPEs (HG-PHs) have drawn attention recently [4-8] due to their well-defined porous structures and their wide applicability [9-15]. However, HG-PHs have relatively low moduli, which may be a drawback for some applications. HG-PHs would be suitable for more applications if their mechanical properties could be enhanced [16]. The network-based approaches used to enhance the mechanical properties of hydrophobic polyHIPEs include the formation of organic interpenetrating polymer networks (IPNs) [17,18], the formation of hybrid interconnecting networks [19-21], and the introduction of physical crosslinking through crystallinity [22-24]. Several approaches have been developed to improve the mechanical properties of HG-PHs, and these approaches include using specific monomers [25,26], enhancing the degree of crosslinking [26], filling with suitable liquids [27], filling with rubber [28] and reducing the amount of surfactant [27].

The synthesis of doubly-crosslinked hydrogels has been reported and the mechanical properties of these hydrogels were improved significantly [29-31]. Incorporation of a dynamic interaction (such as a physical interaction or a dynamic covalent interaction) [31-33] as the second crosslinking network may lead to the formation of DC-PHs with dynamic properties, which, according to embodiments of the present invention, enhances the hydrogel's properties. Ionic interactions have been introduced into HG-PHs, producing HG-PHs with ion responsiveness and enhanced moduli have been obtained [34]; however, in that case, special monomers were specifically synthesized and the strength of the hydrogels was relatively low (they could flow). The relatively low strength of these HG-PHs may indicate relatively weak ionic interactions [35]. A study that combined covalent crosslinking with dynamic interactions (reversible metal coordination crosslinking) reported significant shrinkage upon introduction of calcium ions to a methacrylate-modified alginate hydrogel, and a reduction in modulus [Zhou, S. et al., *J. Mat. Chem. B.*, 2013, 1(37), pp. 4703-4866]. Thus, the synthesis of robust DC-PHs with high modulus and dynamic reversible interactions has yet to be accomplished, presumably due to the nature of the dynamic ionic interactions.

SUMMARY OF THE INVENTION

Embodiments of the present invention provide, inter alia, doubly-crosslinked polyHIPEs (DC-PHs) from hydrogel polyHIPEs (HG-PHs), obtainable by exposure of the HG-PHs to certain agents (e.g., via metal coordination), and processes of their fabrication. In a demonstrative exemplary embodiment, HG-PHs were copolymers of acrylamide (AAm) and sodium acrylate (NaA), which provides the —COO$^-$ groups for metal coordination crosslinking. The demonstrative exemplary DC-PHs were fabricated by adding FeCl$_3$ to HG-PHs containing —COO$^-$ groups, thus forming a second crosslinking network via metal coordination with Fe$^{3+}$ cations. The demonstrative exemplary DC-PHs exhibited enhanced mechanical behavior and shape memory effects, while preserving the interconnected macroporous structures and rapid water absorption.

Thus, according to an aspect of some embodiments of the present invention, there is provided a composition-of-matter that includes a continuous HIPE-templated doubly-crosslinked hydrogel, the hydrogel that includes a swelling medium, at least one coordinative metal atom or ion thereof, and a fixed-crosslinked polymer that that includes a plurality of residues of at least one hydrogel-forming monomer, a plurality of residues of at least one ligand-bearing monomer, a plurality of residues of at least one crosslinking monomer, wherein:

each of the plurality of residues of at least one ligand-bearing monomer exhibits at least one metal coordinative ligand, capable of forming metal coordination bonding with the coordinative metal atom or ion thereof;

the polymer that includes at least 0.1 wt. % of the plurality of residues of the at least one ligand-bearing monomer;

the polymer is characterized by a fixed-crosslinking level of at least 0.1 wt. %; and the hydrogel that includes at least or up to a non-washable amount of the coordinative metal or ion thereof.

In some embodiments, at least 1% of the coordinative metal or ion thereof is removably attached to at least two of the plurality of residues of the at least one ligand-bearing monomer via reversible metal-coordination bonding.

In some embodiments, the composition-of-matter provided herein is characterized by a modulus of at least 50 kPa when fully swollen with an aqueous media or water.

In some embodiments, the fixed-crosslinked polymer is characterized by a modulus of less than 40 kPa when fully swollen with an aqueous media or water and essentially devoid of the plurality of at least one coordinative metal atom or ion thereof.

In some embodiments, the composition-of-matter provided herein is characterized by a metal responsive volumetric shrinkage is lower than about 30.%

In some embodiments, the coordinative metal is a transition metal selected from the group consisting of Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Jr, Pt, Au, Hg, Ac, Rf, Db, Sg, Bh, Hs, Mt, Ds, Rg, and Cn.

In some embodiments, the coordinative metal is an ion selected from the group consisting of Zn2+, Cu2+, Co2+ and Fe+3.

In some embodiments, the hydrogel-forming monomer is selected from the group consisting of acrylamide, hydroxyethyl methacrylate, hydroxyethyl acrylate, acrylic acid, methacrylic acid, styrene sulfonate, and combinations thereof.

In some embodiments, the hydrogel-forming monomer is acrylamide.

In some embodiments, the ligand-bearing monomer is selected from the group consisting of sodium acrylate, sodium methacrylate, sodium 2-acrylamido-2-methyl-1-propanesulfonic acid, sodium 4-styrenesulfonate, 1-vinylimidazole, 1-imidazol-1-yl-2-methylprop-2-en-1-one, and 2-(methacryloyloxy)ethyl 1H-imidazole-1-carboxylate, and any combination thereof.

In some embodiments, the ligand-bearing monomer is sodium acrylate and/or 1-vinylimidazole.

According to another aspect of some embodiments of the present invention, there is provided a process of manufacturing the composition-of-matter presented herein, which is effected by:

soaking the hydrogel in a metal-charging solution to thereby form the metal coordination bonding and obtain the doubly-crosslinked hydrogel, and washing the doubly-crosslinked hydrogel with a metal-washing solution, to thereby remove washable unbound coordinative metal or ion thereof and obtain the composition-of-matter.

In some embodiments, the process further includes, prior to the soaking step, synthesizing the hydrogel, essentially as presented herein.

According to another aspect of some embodiments of the present invention, there is provided an article-of-manufacturing, that includes the composition-of-matter presented herein. According to another aspect of some embodiments of the present invention, there is provided a use of the composition-of-matter provided herewith, selected from the group consisting of a shape-memory hydrogel, a water-uptake hydrogel, a metal atom/ion extracting hydrogel, and ion exchange substance.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying figures. With specific reference now to the figures in detail, it is stressed that the particulars shown are by way of example and for purposes of illustrative discussion of embodiments of the invention. In this regard, the description taken with the figures makes apparent to those skilled in the art how embodiments of the invention may be practiced.

In the figures:

FIGS. 4A-C present comparative compressive stress-strain curves of the PH-16-Y and DC-16-Y exemplary samples, wherein water-swollen samples are shown in FIG. 4A, dry samples are shown in FIG. 4B, and the effect of the NaA content on the modulus of the PH-16-Y and DC-16-Y in both the swollen and dry states are shown in FIG. 4C;

FIGS. 5A-E show various aspects of the shape-memory attribute, characterizing the composition-of-matter provided herein, wherein FIGS. 5A-D are photographs of shape fixation and release (10 mm scale bars) showing a highly deformable PH-2-25 (FIG. 5A), the fixed helical shape of DC-2-25 (FIG. 5B), DC-2-25 maintaining its fixed helical shape under its own weight (FIG. 5C), shape-released R-PH-2-25 (FIG. 5D), and showing the increase in the R-PH-2-25 mass and length with the time of immersion in a 0.06 M aqueous solution of citric acid (FIG. 5E);

FIGS. 6A-B present various aspects of metal coordination of the DC-PHs provided herein, wherein FIG. 6A is a plot showing the reduction in the uptake within water-swollen PH-2-25 upon immersion in 0.06 M aqueous solutions of various salts ($FeCl_3$, $CaCl_2$, $CuBr_2$ or $ZnCl_2$), and FIG. 6B is a photograph of PH-16-13 and the $Fe^{3+}$ crosslinked DC-16-13 (scale bars are 10 mm);

DESCRIPTION OF SOME SPECIFIC EMBODIMENTS OF THE INVENTION

Figure 1:
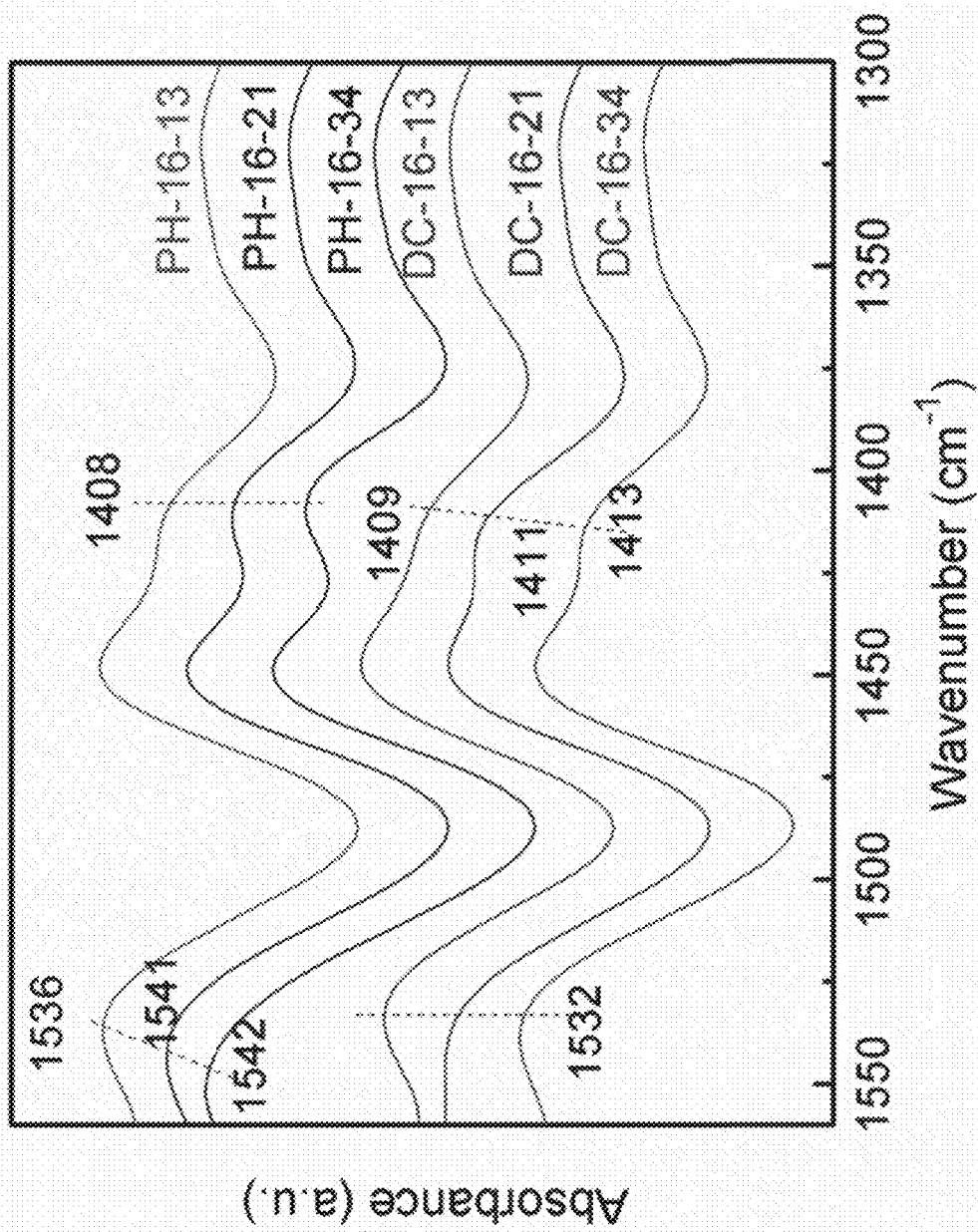
FIG. 1 presents a comparative plot of the FTIR spectra obtained for the PH-16-Y and the DC-16-Y series.

The present invention, in some embodiments thereof, relates to polyHIPEs, and more particularly, but not exclusively, to polyHIPEs that can switch reversibly from flexible to rigid.

The principles and operation of the present invention may be better understood with reference to the figures and accompanying descriptions.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

Metal coordination is a dynamic interaction that is stronger than ionic interactions [36]. Metal coordination has been reported to significantly enhance the mechanical properties of various three-dimensional networks by further crosslinking the pre-formed covalent networks, endowing them with dynamic properties [37-39]. While conceiving the present invention, the inventors have considered that metal coordination may have the potential to crosslink hydrogel polyHIPEs (HG-PHs) and generate doubly-crosslinked polyHIPEs (DC-PHs) that will exhibit enhanced mechanical properties and dynamic behavior. While reducing the present invention to practice, the present inventors have encountered the challenges of fabrication of DC-PHs from HG-PHs via metal coordination, which may be associated with the amount of aqueous solution uptake within the HG-PH that may be limited by the nature of the hydrogel-forming monomers, the amount of the crosslinking monomer, the internal phase volume fraction, and the nature of the aqueous solution.

A Doubly-Crosslinked polyHIPE:

The composition-of-matter presented herein possesses characteristics that stem from having two different modes of polymeric chain crosslinking, one permanent (or fixed) and one transitory, whereas the permanent crosslinking mode generally yields the hydrogel properties, the transitory crosslinking mode yields other properties such as shape memory, and both contribute to the mechanical properties of the composition-of-matter. Each of the crosslinking modes requires the presence of certain moieties and functionalities (functional groups) to be present in the polymer that forms the continuous HIPE-templated hydrogel. In general, these functionalities are present in side-chain moieties of the various residues that constitute the polymer. Other properties of the composition-of-matter stem from its unique microstructure—that of a polyHIPE.

Thus, according to an aspect of embodiments of the present invention, there is provided a composition-of-matter, which includes a continuous HIPE-templated doubly-crosslinked hydrogel. The hydrogel of the composition-of-matter presented herein comprises a polymer—the main-chain thereof includes a plurality of residues of at least one hydrogel-forming monomer, a plurality of residues of at least one ligand-bearing monomer, and a plurality of residues of at least one crosslinking monomer. The composition-of-matter further includes a swelling medium (the liquid that the hydrogel absorbs and swells with), and further includes a plurality of at least one coordinative metal or ion thereof.

The composition-of-matter may further be characterized by:

the polymer is a fixed-crosslinked polymer having at least 0.1 wt. %, or 0.5 wt. %, or 1 wt. %, or 2.5 wt. %, or at least 5 wt. % of ligand-bearing monomer residues;

the polymer being characterized by a fixed-crosslinking level of at least 0.1 wt. %, or 0.5 wt. % or at least 1 wt. %; and the hydrogel comprises at least or up to a non-washable amount of the coordinative metal or ion thereof.

Thus, the composition-of-matter provided herein includes a swollen doubly-crosslinked hydrogel, namely a hydrogel matrix (referring to the dry polymeric mass) having the microstructure that originated in its parent HIPE, that is fixed-crosslinked and transitorily-crosslinked at the same time, whereas the hydrogel includes a non-washable amount of a coordinative metal or ions thereof, and is swollen with a swelling medium. The term "swelling medium" as used in the context of embodiments of the present invention, refer to any liquid medium which the hydrogel matrix can absorb and be swollen thereby. While it is known that some hydrogels are pH-sensitive, namely their swelling aptitude is pH-dependent, the herein-used term "swelling medium" refer to the liquid medium in which the hydrogel can be swollen thereby, regardless of it pH and contents (main carrier, solutes etc.).

The mechanism of water uptake within gels is known to be affected by the pH of the swelling medium. The hydrogel's polymer, according to some embodiments of the present invention, may be a copolymer. The copolymer composition has an effect on the static and dynamic swelling behavior of the hydrogel, as well as an effect on the degree of pH-dependency of the swelling.

As is well accepted in the art in the molecular context, and as used herein, the term "residue" refers to a portion, and typically a major portion of a molecular entity, such as molecule or a part of a molecule such as a group, which has underwent a chemical reaction and is now covalently linked to another molecular entity. In the context of the present embodiments, a residue is an equivalent term to a monomeric unit within the polymer. In the context of embodiments of the present invention, the term "residue" refers to the part of a monomer that after polymerization is made part of the main-chain of a polymer. For example, the molecular entity can be an amino acid molecule, and the portion of the amino acid which forms a part of a polypeptide chain (a polymer) after the formation of the polypeptide chain, is an amino acid residue (a monomer). An amino acid residue is therefore that part of an amino acid which is present in a peptide sequence upon reaction of, for example, an alpha-amine group thereof with a carboxylic group of an adjacent amino acid in the peptide sequence, to form a peptide amide bond and/or of an alpha-carboxylic acid group thereof with an alpha-amine group of an adjacent amino acid in the peptide sequence, to form a peptide amide bond.

As used herein, the phrase "moiety" describes a part, and preferably a major part of a chemical entity or compound, which typically has certain functionality or distinguishing features.

In some embodiments, the composition-of-matter is further characterized by a modulus of at least 50 kPa when fully swollen with an aqueous media or water.

In some embodiments, the polymer is characterized by a modulus of less than 40 kPa when fully swollen with an aqueous media or water and essentially devoid of coordinative metal atoms or ion thereof.

The term "doubly-crosslinked hydrogel", as used herein, refers to a hydrogel exhibiting two different types of cross-links, e.g., permanent, fixed-crosslinks (such as covalent crosslinks) and transitory-crosslinks (such as metal-ligand coordination crosslinks), as these terms are discussed hereinbelow.

In some embodiments, the polymer's main-chain consists of carbon-carbon bonds.

In some embodiments, the composition-of-matter presented herein is essentially devoid of a polysaccharide. In some embodiments, the composition-of-matter presented herein is essentially devoid of alginate, naturally occurring and/or synthetically modified.

In some embodiments, the polyHIPE, or the composition-of-matter presented herein, is essentially devoid of emulsion-stabilizing particles, such as those used in Pickering HIPE.

It is noted herein that in contrast to some hydrogels known in the art, that exhibit the potential of forming a DC-PH simply due to the presence of hydrogel-forming and ligand-bearing residues therein, the DC-PHs provided herein actually are doubly crosslinked with two difference types of crosslinks (fixed/permanent and transitory), which means the presently provided compositions-of-matter include not only the hydrogel matrix, but also the swelling medium and non-washable atoms/ions of at least one coordinative metal.

As demonstrated in the Examples section that follows below, exemplary HG-PHs, according to some embodiments of the present invention, based on AAm and NaA, were successfully fabricated using solvent exchange at −25° C. followed by vacuum drying. DC-PHs were successfully fabricated from the corresponding HG-PHs via metal coordination, crosslinking the —COO⁻ groups with $Fe^{3+}$. The interconnected macroporous structures and the rapid water absorption of the HG-PHs were preserved in the DC-PHs, with both reaching their equilibrium water uptakes in less than one minute. The water uptakes in the DC-PHs were smaller than those in the corresponding HG-PHs, reflecting the presence of double crosslinking. The swollen DC-PHs exhibited compressive moduli that were significantly higher than those of the corresponding swollen HG-PHs, with the relatively fragile HG-PHs becoming robust DC-PHs. Double crosslinking also significantly enhanced the compressive moduli of the dry HG-PHs, reaching 80 MPa in the DC-PHs. The metal coordination was easily removed through the light-induced reduction of the $Fe^{3+}$ in the presence of citric acid. The reversibility of the metal coordination crosslinking endowed DC-2-25 with a multiple-cycle shape memory behavior.

HIPE-Templated Polymeric Compositions-of-Matter:

As known in the art and presented hereinabove, high internal phase emulsions (HIPEs) are concentrated systems of water-in-oil, oil-in-water, or oil-in-oil possessing a large volume of internal, or dispersed phase, with a volume fraction of over 0.74, resulting in the deformation of the dispersed phase droplets into polyhedra or in the formation of a polydisperse droplet size distribution. The dispersed droplets are separated by thin films of continuous phase. As HIPEs are intrinsically unstable, the HIPE is typically stabilized by adding an emulsion stabilizer to either the external phase and/or the internal phase, and preferably the surfactant used as an emulsion stabilizer is insoluble in the internal phase.

As discussed hereinabove, polymer materials can be prepared from HIPEs if one or the other (or both) phases of the emulsion contain polymerizable monomeric species. This process yields a range of foam-like products with widely differing properties. As the concentrated emulsion acts as a scaffold or template, the microstructure of the resultant material is determined largely by the emulsion structure immediately prior to polymerization and through changes that can occur during polymerization and/or during post-polymerization processing.

According to some embodiments of the present invention, the composition-of-matter is characterized and therefore can be structurally identified by its microstructure, which is structurally templated by a high internal phase emulsion (HIPE). A polyHIPE, a continuous polymer envelope surrounding the dispersed droplets of the internal phase, results if the continuous, external phase contains polymerizable monomers. A concentrated latex results if the discrete, internal phase contains polymerizable monomers. The composition-of-matter presented herein comprises a continuous hydrogel (HG) matrix, which is the product of a polymerized external phase of a HIPE. Thus, the HG-PHs and the DC-PHs presented herein include matrix having the shape and microstructure of a predecessor HIPE. By having a microstructure of a polyHIPE, it is meant that the microstructure of the composition-of-matter presented herein results from a polymerization process that occurs within a HIPE.

The composition-of-matter presented herein is HIPE-templated, namely its microstructure is a projection of the microstructure of a HIPE before and after its polymerization. Briefly, a HIPE is a plurality of tightly-packed substantially spheroidal and/or polyhedral droplets of various sizes, constituting the dispersed internal phase, separated by walls of a liquid constituting the continuous external phase. The average size and size distribution of the droplets is controlled by the chemical composition and mechanical treatment of the emulsion phases, and are typically characterized by a population of one or more narrowly distributed sizes. For example, average droplet size and distribution can be controlled by use of emulsion stabilizers (surfactants; surface-active substances, solid particles etc.), which may act to reduce the tendency of the droplets to coalesce.

The term "polyHIPE" can therefore be used as a structural term to describe a highly porous monolithic structure of thin walls separating a collection of tightly-packed voids, referred to herein as the "matrix". The walls are typically thinner at the closest distance between what was tightly-packed droplets before polymerization, and thicker at the spaces between adjacent droplets. When a HIPE is polymerized to yield a polyHIPE, the same microstructure is substantially preserved. The polymerization of the continuous phase of a HIPE "locks in" the HIPE's droplets before any destabilization through droplet coalescence and/or Ostwald ripening can occur.

Hence, the phrase "structurally-templated by an external phase of a high internal phase emulsion (HIPE)", or its equivalent term "HIPE-templated", are expressions of structural definitions rather than a process-related expressions, since they relate the microstructure of the HIPE to the microstructure of the resulting matrix of the composition-of-matter, which is no longer an emulsion but a solid matter, referred to in the context of the present embodiments as a polyHIPE or a HG matrix, or simply as a "matrix". The phrase "HIPE-templated HG composition-of-matter" is used herein interchangeably with the shortened phrases "HG composition-of-matter", "DC composition-of-matter", "HIPE-templated composition-of-matter", or "composition-of-matter".

In some instances, the thinnest areas some of the walls give way to interconnecting windows connecting droplets in adjacent voids, thereby forming an open-cell microstructure. In the case of open-cell polyHIPEs, when the polyHIPE is dried and the dispersed phase is removed, the droplets leave empty voids in their place, which are interconnected by the windows in the walls, wherein the voids can be referred to as having an open-cell microstructure.

According to some embodiments of the present invention, the microstructure of the polymeric compositions-of-matter is structurally-templated by an oil-in-water (o/w) high internal phase emulsion. In an oil-in-water HIPE the polymerization reaction may entrap the dispersed organic internal phase, while the polymerized walls serve for the encapsulation thereof.

In some embodiments of the present invention, the composition-of-matter of comprises at least 74% by volume of the liquid, or at least 76%, 78%, 80%, 82%, 84%, 86%, 88%, or 90% by volume of the liquid.

By definition, a HIPE exhibits at least 74% internal phase, although originally it was 70%. When using emulsion templating to produce porous monolithic medium internal phase emulsions (MIPEs) the internal phase content ranges from 30% to 74%, or from 50% to 70%, and low internal phase emulsions (LIPE) contain internal phase contents that are less than 30%. In the context of embodiments of the present invention, unless stated otherwise, the term "HIPE-templated hydrogel/polymer" encompasses, at least in the sense of the structural definition, the microstructure of HIPE-, MIPE- and LIPE-templated microstructures, wherein the lower the internal phase content, the thicker the walls and the better the encapsulation thereon in the hydrogel/polymer. In some embodiments, the volume fraction of the polymerizable external phase in the HIPE ranges from 0.5 to 0.95, or from 0.7 to 0.95, or from 0.74 to 0.95, or from 0.74 to 0.99.

As used herein, the term "continuous" refers to a macroscopic as well as a microscopic property of the matrix forming a part of the composition-of-matter presented herein. According to some embodiments of the present invention, the matrix is a continuous mass of a hydrogel, as opposed to an assembly or aggregate of discrete bodies which are discontinuous with respect to one-another even if these are in direct contact with one-another. Hence, in the context of embodiments of the present invention, the phrase "continuous HG matrix" refers to a continuous mass of a hydrogel.

The term "swollen" and its grammatical inflections, as used in the context of the present invention, relate to any form of accommodating a liquid substance, herein an aqueous medium or water, within a matrix, herein the continuous hydrogel matrix. As used herein, uptake of a liquid in a continuous hydrogel matrix, as in the context of the present invention, describes infiltration of the liquid within the hydrogel matrix, such that the liquid is soaked into the polymeric matrix, and the polymeric matrix is swollen therewith.

Hydrogel Forming Monomers:

In some embodiments of the present invention, the polymerized external phase is a crosslinked polymer, and in particular, the polymerized external phase is a hydrogel (HG). In the context of some embodiments of the present invention, the hydrogel is a crosslinked polymer that exhibits fixed (permanent) crosslinks, and is therefore referred to as a fixed-crosslinked polymer. In the context of some embodiments of the present invention, the hydrogel is defined as a monolithic network of inter- and intra-crosslinked polymer chains that comprise residues of at least one type of a hydrophilic monomer, and that can absorb water molecules and undergo swelling thereby. A hydrophilic monomer, in the context of embodiments of the present invention, is a polymerizable water-soluble molecule. In the context of embodiments of the present invention, polymerization and crosslinking a hydrophilic monomer produces a hydrogel, thus this type of monomers is referred to as "hydrogel-forming monomer".

In some embodiments, the residue of a hydrogel-forming monomer may also act as a residue of a ligand-bearing monomer, at least under certain conditions that confer metal-coordination bond formation. In some embodiments, the hydrogel-forming monomer is different than the ligand-bearing monomer.

In some embodiments, the hydrogel includes monomers, such as, but not limited to hydroxyethyl methacrylate, hydroxyethyl acrylate, acrylamide, acrylic acid, methacrylic acid, styrene sulfonate and combinations thereof. The polymerization mixture may include non-ionic (e.g., AAm, HEMA, HEA) and/or anionic hydrogel-forming monomers (e.g., AAc, MAAc, SS).

According to some embodiments, the hydrogel-forming monomers constitute less than 10% of the total number or mass polymerizable monomers found in the continuous aqueous phase, or less than 9%, less than 8%, less than 7%, less than 6%, less than 5%, less than 4%, less than 3%, less than 2%, or less than 1% of the polymerizable phase. According to some embodiments, the hydrogel-forming monomers constitute 100% of the polymerizable monomers, provided that at least 0.1% thereof are also ligand-bearing monomers, and provided that at least 0.1% thereof are also crosslinking monomers. According to some embodiments, the hydrogel-forming monomers constitute about or at least 0.5, 1, 5, 6, 10 or 20% of the polymerizable phase. In some embodiments, the HIPE includes self-crosslinking monomers, such as, but not limited to N,N-dimethylacrylamide (DMAA).

In some embodiments of the present invention, the composition-of-matter comprises a hydrogel that is characterized by covalent crosslinks, afforded by including at least one type of a crosslinking agent, also referred to herein as a crosslinking monomer, capable of forming covalent crosslinks between polymeric chains during a polymerization reaction. In the context of the present invention, covalent crosslinking is referred to as "fixed crosslinking".

Properties of hydrogels, such as water uptake, mechanical attributes (strength, ductility, elastic modulus, elongation, brittleness, etc.) are governed also by the crosslinking level. Typically, the more crosslinked the polymer, the stiffer it is (requires more stress to compress), up to a crosslinking level where it becomes rigid.

A crosslink is a bridge between polymeric chains, which is made by placing "crosslinking units" between "regular main-chain units" or "main-chain positions"; the more crosslinking units being incorporated in the main-chain positions, the higher is the crosslinking level. According to some embodiments, the polymer constituting the composition-of-matter is fixed-crosslinked to a level that ranges from a high of 20 fixed-crosslinking units per 100 main-chain positions (including monomeric unit positions and fixed-crosslinking unit positions), to a low of 0.1 fixed-crosslinking units per 100 main-chain positions. In some embodiments, the fixed-crosslinking level ranges from 0.1 to 10, from 1 to 15, or from 1 to 10 fixed-crosslinking units per 100 main-chain positions. In some embodiments, the fixed-crosslinking level is about 15, 14, 13, 12, 11, 10, 9, 8, 7, 6, 5, 4, 3, 2, 1, 0.5 or about 0.1 fixed-crosslinking units per 100 main-chain positions. One fixed-crosslinking unit per one hundred main-chain positions is equivalent to a fixed-crosslinking level of one molar (mol) percent. In some embodiments, the fixed-crosslinking level of the polymer in the composition-of-matter is about or at least 0.5 mol. %, 1 mol. %, 1.5 mol. %, 2 mol. %, 2.5 mol. %, 3 mol. %, 3.5 mol. %, 4 mol. %, 4.5 mol. %, 5 mol. %, 5.5 mol. %, 6 mol. %, 6.5 mol. %, 7 mol. %, 7.5 mol. %, 8 mol. %, 8.5 mol. %, 9 mol. %, 9.5 mol. %, 10 mol. %, 10.5 mol. %, 11 mol. %, 11.5 mol. %, 12 mol. %, 12.5 mol. %, 13 mol. %, 13.5 mol. %, 14 mol. %, 14.5 mol. %, 15 mol. %, 16 mol. %, 17 mol. %, 18 mol. %, 19 mol. %, 20 mol. %, 30 mol. %, 40 mol. %, or at least 50 mol. %.

In some embodiments, the fixed-crosslinking level of the polymer in the composition-of-matter is about or at least about 0.5 wt. %, 1 wt. %, 1.5 wt. %, 2 wt. %, 2.5 wt. %, 3 wt. %, 3.5 wt. %, 4 wt. %, 4.5 wt. %, 5 wt. %, 5.5 wt. %, 6 wt. %, 6.5 wt. %, 7 wt. %, 7.5 wt. %, 8 wt. %, 8.5 wt. %, 9 wt. %, 9.5 wt. %, 10 wt. %, 10.5 wt. %, 11 wt. %, 11.5 wt. %, 12 wt. %, 12.5 wt. %, 13 wt. %, 13.5 wt. %, 14 wt. %, 14.5 wt. %, 15 wt. %, 16 wt. %, 17 wt. %, 18 wt. %, 19 wt. %, 20 wt. %, 30 wt. %, 40 wt. %, or about or at least about 50 wt. %. In some embodiments, the fixed-crosslinking level of the polymer in the composition-of-matter is about at least 1 wt. %.

In some embodiments, the fixed-crosslinking level is expressed as weight percentage of the fixed-crosslinking molecule in the total weight of the monomers forming the polymer. Hence, the fixed-crosslinking level of the hydrogel, according to some embodiments of the present invention, ranges from 50 wt. % to 0.1 wt. %, and any sub-range therebetween, or any value therebetween. Alternatively, the fixed-crosslinking level of the hydrogel ranges 20-1 wt. %, or 15-5 wt. %, and any sub-range therebetween, or any value therebetween.

As demonstrated in the Examples section below, the crosslinking level is one of the factors that govern the mechanical properties of the composition-of-matter presented herein, as well as its aqueous medium absorption capacity, whereas the two traits react inversely to the crosslinking level; absorption decreases with the increase of the crosslinking level while stiffness increases with the increase of the crosslinking level.

The type of covalent- or fixed-crosslinking agent is selected according to its compatibility with the other polymerizable units and the conditions of the polymerization reaction. The fixed-crosslinking agent is also selected according to its solubility, wherein a crosslinking agent that can dissolve in the pre-polymerizable mixture together with the monomers will be a natural choice, while crosslinking agents that can dissolve in the other phase but can cross the phase boundary during the polymerization process are also contemplated. For example, ethylene glycol dimethacrylate (EGDMA) is hydrophobic and can dissolve more readily in the internal organic phase, and it is contemplated as a crosslinking agent since it has been shown to take part in a polymerization reaction of an emulsion that occurs in the aqueous phase.

Non-limiting examples of fixed-crosslinking agents include N,N'-methylenebisacrylamide (MBAAm) ethylene glycol diacrylate, diethylene glycol diacrylate, N-(1-hydroxy-2,2-dimethoxyethyl)acrylamide, N,N'-(1,2-dihydroxyethylene)bisacrylamide, and any combination thereof.

Ligand-Bearing Monomers:

It is noted that hydrogels can be afforded by non-fixed crosslinking only (no fixed crosslinking), such as can be achieved by metal coordination, as in the case of alginate and calcium ions. In the context of embodiments of the present invention, metal coordination bonding is responsible to non-fixed crosslinking in the hydrogel, and since it is dynamic, reversible or otherwise transitory, this form of crosslinking is referred to herein as "transitory crosslinking".

According to some embodiments of the present invention, the composition-of-matter presented herein is characterized by having a fixed, covalently crosslinked network of polymeric main-chains, and a dynamic, metal-coordinative crosslinked network of polymeric main-chains. By "dynamic", or "transitory", it is meant that the metal coordinative bonds are reversible under certain conditions, and that these conditions essentially do not affect covalent bonding in the polymer. The composition-of matter presented herein is therefore characterized by having at least 1% of a coordinative metal (or ion thereof) acting as transitory crosslinking members between two or more ligand-bearing pendent groups of two residues of a ligand-bearing monomers in the polymer. By being removable under certain conditions, due to the reversible nature of most metal-coordination bonding, it is said that this system of crosslinks is transitory. Alternatively, the composition-of matter presented herein is characterized by having at least 2%, 3%, 4%, 5%, 10%, 15%, 20%, 25%, 30%, 35%, 40%, 45%, 50%, 55%, 60%, 65%, 70%, 75%, 80%, 85%, 90%, 95%, or essentially 100% of atoms or ions of the coordinative metal are acting as transitory crosslinking members.

According to some embodiments of the present invention, the HG-PH comprises metal-coordination functional groups. In some embodiments, the functional groups form a part of the pendant group of residues in the main-chain of the hydrogel polymer. Monomers that impart a main-chain residue that presents at least one metal-coordination functional group is referred to herein as a "ligand-bearing monomer". Metal-coordination functional groups are referred to herein as ligands; however, it is noted herein that the term "ligand" also encompasses molecular species that are not covalently bound or connected to the hydrogel polymer, such as water, ammonia, halide ions dissolved gases and the like. According to some embodiments, some hydrogel-forming monomers are also ligand-bearing monomers.

Ligand-bearing monomers, once polymerized, present at least one functional group on their pendent moiety that can make coordinative (complexation) bonds with a metal atom/ion. In essence, a hydrogel, according to embodiments of the present invention, can be fabricated such that it exhibits very few ligand-bearing pendent groups (1% or even less), and up to any percentage of the polymer, namely 100% of the residues of the polymer are of ligand-bearing monomers, based on the total weight of the pre-polymerization mixture (1-100 wt. %), as long as there are some ligands available for transitory crosslinking by metal coordination. According to some embodiments, the pre-polymerization mixture that affords the hydrogel, includes ligand-bearing monomers that constitute 5-40 wt. % of the hydrogel-forming monomers (not accounting for the crosslinking agent) in the pre-polymerization mixture, or about 5-40 wt. % of the pre-polymerization mixture. In other words, the main-chain of the hydrogel comprises 5-40% residues of ligand-bearing monomers. In some embodiments, the amount of ligand-bearing monomers in the hydrogel-forming monomers, or in the pre-polymerization mixture, is about or greater than about 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, or about, or greater than, or less than about 40%, based on the total weight of the pre-polymerization mixture.

According to some embodiments of the present invention, the pre-polymerization consists essentially of ligand-bearing monomers and crosslinking agents, and is essentially devoid of non-ligand-bearing monomers. In such case the ligand-bearing monomers act as hydrogel-forming monomers.

The pre-polymerization mixture may comprise any type of ligand-bearing monomers. In some embodiments, the ligand-bearing monomers exhibit at least one non-polymerizing metal-coordination functional group (a group that corresponds to the pendant group on the resulting polymer) referred to herein as a ligand, such as, without limitation, carboxyl (—COO—) groups, amine groups, hydroxyl groups, thiol groups, halo groups, cyano (—CN) groups, nitro (—NO$_2$) groups, heteroalicyclic, aryl and heteroaryl groups (e.g., imidazole, as found in 1-vinylimidazole).

Additional examples of common ligands, namely functional groups, ions and small molecules, include:

| Ligand | Formula | Charge | Most common denticity |
|---|---|---|---|
| Iodide (iodo) | I$^-$ | monoanionic | monodentate |
| Bromide (bromido) | Br$^-$ | monoanionic | monodentate |
| Sulfide (thio or less commonly "bridging thiolate") | S$^{2-}$ | dianionic | monodentate (M=S), or bidentate bridging (M—S—M') |
| Thiocyanate (S-thiocyanato) | S—CN$^-$ | monoanionic | monodentate |
| Chloride (chlorido) | —Cl, Cl$^-$ | monoanionic | monodentate |
| Nitrate (nitrato) | —O—NO$_2$ | monoanionic | monodentate |
| Azide (azido) | —N$_3$ | monoanionic | monodentate |
| Fluoride (fluoro) | —F, F$^-$ | monoanionic | monodentate |
| Hydroxide (hydroxido) | —OH, OH$^-$ | monoanionic | monodentate |
| Oxalate (oxalato) | [O—CO—CO—O]$^{2-}$ | dianionic | bidentate |
| Water (aqua) | O—H$_2$ | neutral | monodentate |
| Nitrite (nitrito) | O—N—O$^-$ | monoanionic | monodentate |
| Isothiocyanate (isothiocyanato) | —N=C=S, N=C=S$^-$ | monoanionic | monodentate |
| Acetonitrile (acetonitrilo) | CH$_3$CN | neutral | monodentate |
| Pyridine | C$_5$H$_5$N | neutral | monodentate |
| Ammonia (ammine or "ammino") | —NH$_2$, NH$_3$ | neutral | monodentate |
| Ethylenediamine (en) | NH$_2$—(CH$_2$)$_2$—NH$_2$ | neutral | bidentate |
| 2,2'-Bipyridine (bipy) | NC$_5$H$_4$—C$_5$H$_4$N | neutral | bidentate |
| 1,10-Phenanthroline (phen) | C$_{12}$H$_8$N$_2$ | neutral | bidentate |
| Nitrite (nitro) | —NO$_2$ | monoanionic | monodentate |
| Triphenylphosphine | P—(C$_6$H$_5$)$_3$ | neutral | monodentate |
| Cyanide (cyano) | C=N$^-$; N=C$^-$ | monoanionic | monodentate |
| Carbon monoxide (carbonyl) | CO | neutral | monodentate |

The entries in the table are sorted by field strength, binding through the stated atom (i.e. as a terminal ligand), the "strength" of the ligand changes when the ligand binds in an alternative binding mode (e.g., when it bridges between metals) or when the conformation of the ligand gets distorted (e.g., a linear ligand that is forced through steric interactions to bind in a nonlinear fashion).

Other generally encountered ligands include (alphabetical order):

| Ligand | Formula | Charge | Most common denticity |
|---|---|---|---|
| Acetylacetonate acac) | CH$_3$—CO—CH$_2$—CO—CH$_3$ | monoanionic | bidentate |
| Alkenes | R$_2$C=CR$_2$ | neutral | |
| Aminopolycarboxylic acids (APCAs) | | | |
| BAPTA (1,2-bis(o-aminophenoxy)ethane-N,N,N',N'-tetraacetic acid) | | | |
| Benzene | C$_6$H$_6$ | neutral | |
| 1,2-Bis(diphenylphosphino)ethane (dppe) | (C$_6$H$_5$)$_2$P—C$_2$H$_4$—P(C$_6$H$_5$)$_2$ | neutral | bidentate |
| 1,1-Bis(diphenylphosphino)methane (dppm) | (C$_6$H$_5$)$_2$P—CH$_2$—P(C$_6$H$_5$)$_2$ | neutral | |
| Corrales | | | tetradentate |
| Crown ethers | | neutral | |
| 2,2,2-cryptand | | | hexadentate |
| Cryptates | | neutral | |
| Cyclopentadienyl (Cp) | —C$_5$H$_5$ | monoanionic | |
| Diethylenetriamine (dien) | C$_4$H$_{13}$N$_3$ | neutral | tridentate |
| Dimethylglyoximate (dmgH$^-$) | | monoanionic | |
| 1,4,7,10-tetraazacyclododecane-1,4,7,10-tetraacetic acid (DOTA) | | | |
| Diethylenetriaminepentaacetic acid (DTPA) (pentetic acid) | | | |
| Ethylenediaminetetraacetic acid (EDTA) (edta$^{4-}$) | ($^-$OOC—CH$_2$)$_2$N—C$_2$H$_4$—N(CH$_2$—COO$^-$)$_2$ | tetraanionic | hexadentate |
| Ethylenediaminetriacetate | $^-$OOC—CH$_2$NH—C$_2$H$_4$—N(CH$_2$—COO$^-$)$_2$ | trianionic | pentadentate |
| Ethyleneglycolbis(oxyethylenenitrilo)tetraacetate(egta$^{4-}$) | ($^-$OOC—CH$_2$)$_2$N—C$_2$H$_4$—O—C$_2$H$_4$—O—C$_2$H$_4$—N(CH$_2$—COO$^-$)$_2$ | tetraanionic | octodentate |

| Ligand | Formula | Charge | Most common denticity |
|---|---|---|---|
| Fura-2 | | | |
| Glycinate (glycinato) | $NH_2CH_2COO^-$ | monoanionic | bidentate |
| Heme | | dianionic | tetradentate |
| Iminodiacetic acid (IDA) | | | tridentate |
| Nicotianamine | | | |
| Nitrosyl | $NO^+$ | cationic | |
| Nitrilotriacetic acid (NTA) | | | |
| Oxo | $O^{2-}$ | dianion | monodentate |
| Pyrazine | $N_2C_4H_4$ | neutral | ditopic |
| Scorpionate ligand | | | tridentate |
| Sulfite | $SO_3^{2-}$ | monoanionic | monodentate |
| 2,2'; 6',2''-Terpyridine (terpy) | $NC_5H_4$—$C_5H_3N$—$C_5H_4N$ | neutral | tridentate |
| Triazacyclononane (tacn) | $(C_2H_4)_3(NR)_3$ | neutral | tridentate |
| Tricyclohexylphosphine | $P(C_6H_{11})_3$ or $PCy_3$ | neutral | monodentate |
| Triethylenetetramine (trien) | $C_6H_{18}N_4$ | neutral | tetradentate |
| Trimethylphosphine | $P(CH_3)_3$ | neutral | monodentate |
| Tri(o-tolyl)phosphine | $P(o\text{-tolyl})_3$ | neutral | monodentate |
| Tris(2-aminoethyl)amine (tren) | $(NH_2CH_2CH_2)_3N$ | neutral | tetradentate |
| Tris(2-diphenylphosphineethyl)amine ($np_3$) | | neutral | tetradentate |
| Tropylyium | —$[C_7H_6]+$, $[C_7H_7]+$ | cationic | |
| Carbon dioxide | $CO_2$ | | |

Additional exemplary ligand-bearing monomers of the organosulfur family include, without limitation, 2-acrylamido-2-methylpropane sulfonic acid (AMPS), 2-acrylamido-2-propanesulfonic acid, 1-acrylamido-1-propanesulfonic acid, 2-(methacryloyloxy)ethanesulfonic acid, 2-hydroxy-3-(2-propenyloxy)-propanesulfonic acid, 2-methacrylamido-2-methyl-1-propanesulfonic acid, 2-methyl-2-propene-1-sulfonic acid, 2-propene-1-sulfonic acid, 2-sulfoethyl acrylate, 2-sulfoethyl methacrylate, 3-methacrylamido-2-hydroxypropanesulfonic acid, 3-sulfopropyl acrylate, 3-sulfopropyl methacrylate, 3-sulfopropylacrylate, 3-sulfopropylmethacyrlate, allyl sulfonic acid, allyloxybenzenesulfonic acid, methallyloxybenzenesulfonic acid, methallylsulfonic acid, phenylethenesulfonic acid, styrenesulfonic acid, sulfomethacrylamide, sulfomethylmethacrylamide, vinylsulfonic acid, and any salts thereof, and any combinations thereof.

Exemplary ligand-bearing monomers of the organophosphorous family include, without limitation, 2-methacrylamidoethylphosphoric acid, isopropenylphosphonic acid, methacrylamide phosphonic acid, isopropenylphosphonic acid, vinylphosphonic acid, isopropenylphosphonic anhydride, allylphosphonic acid, ethylidenediphosphonic acid, vinylbenzenephosphonic acid, 3-allyloxy-2-hydroxypropylphosphonic acid, and any salts thereof, and any combinations thereof.

In some embodiments, the ligand-bearing monomer is selected from the group consisting of sodium acrylate (NaA), sodium methacrylate, sodium 2-acrylamido-2-methyl-1-propanesulfonic acid, sodium 4-styrenesulfonate, 1-vinylimidazole (VIm), 1-imidazol-1-yl-2-methylprop-2-en-1-one, and 2-(methacryloyloxy)ethyl 1H-imidazole-1-carboxylate. According to embodiments of the present invention, the ligand-bearing monomers may include anionic ligand-bearing monomers (e.g., NaA) and/or cationic ligand-bearing monomers (e.g., VIm)

Coordinative Metal:

According to some embodiments of the present invention, the metal that is used for metal coordination driven transitory crosslinking, include all metals and metal ions that can serve as a coordination center for at least two ligands in a ligand-bearing monomer or a residue thereof.

In some embodiments, the coordinative metal or an ion thereof, is a transition metal, such as, without limitation, Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Jr, Pt, Au, Hg, Ac, Rf, Db, Sg, Bh, Hs, Mt, Ds, Rg, and Cn.

In some embodiments, the metal is in a non-ionic form $M°$, or in an ionic form, which can be singly charged (valency=1) namely $M^{+1}$, or multi-charged (valency>1), namely $M^{+2}$, $M^{+3}$, $M^{+4}$. For example, $Zn^{2+}$, $Cu^{2+}$, $Co^{2+}$ and $Fe^{+3}$.

In some embodiments, the coordinative metal is iron, and more specifically, $Fe^{+3}$.

Hence, according to some embodiments of the present invention, since the hydrogel is doubly-crosslinked by fixed and metal-coordinative crosslinks, the swelling medium in the composition-of-matter provided herein is such that allows and/or confers metal-coordination conditions. By metal-coordination conditions it is meant that the ligands in the polymer experience conditions conducive to forming metal coordination bonds with the coordinative metal or ions thereof, which are found therein. For example, in embodiments where the ligand-bearing residues exhibit pH-sensitive ligands, the metal-coordination conditions dictate that the swelling medium is also characterized by a pH that renders the ligands conducive to form metal-coordination bonds with the metal/metal-ion. In a specific exemplary embodiment, the polymer includes residues of sodium acrylate salt monomers that exhibit negatively charged ligands at a certain pH, at which the ligands can form metal-coordination bonds with ferric ions. Hence, since the definition of the composition-of-matter disclosed herein includes the presence of metal-coordination crosslinks, it is to be understood as defining the presence of metal coordination atoms/ions (M) in the hydrogel, and as defining the swelling medium to be conducive to such metal-coordination crosslinks.

The composition-of matter is also defined by the presence of a non-washable amount of M. In the context of embodiments of the present invention, the metal-coordination crosslinks are reversible, namely the metal can be released under certain conditions, thereby breaking the network of transitory crosslinks in the hydrogel. However, the non-washability of M is defined in the context of a washing solution, which may be essentially the same as the swelling medium, except that it is devoid of M. Thus, according to some embodiments, the amount of the metal atom/ion (M) in the hydrogel is at least or up to the non-washable amount of a given M in a given hydrogel polyHIPE (HG-PH), whereas the term "non-washable", as used herein, refers to the amount of M in the HG-PH that remains essentially stable after the HG-PH has been repeatedly and/or extensively soaked in a relatively concentrated solution of M ("M-charging medium" or coordinative-metal charging solution), and then underwent repeated washing and soaking of the M/HG-PH complex in a washing medium devoid of M ("M-washing medium" or coordinative-metal washing solution), In some embodiments the M-washing medium is the same as the M-charging medium or the swelling medium, except for essentially lacking M. In some embodiment, the non-washability is defined in the context of pure water. In some embodiment, the non-washability is defined in the context of the swelling medium. In some embodiment, the non-washability is defined in the context of an environmental medium, the medium in which the composition-of-matter presented herein is put to use.

In some embodiments of the present invention, the non-washable amount of M is achieved in a "rearrangement" process, as presented in the Examples section that follows below.

According to some embodiments of the present invention, M is coordinated with ligands in the HG-PH. In some embodiments, the ligands form a part of a residue of a ligand-bearing monomer. In some embodiments, at least 1% of M is removably attached to at least two residues of ligand-bearing monomers via reversible metal-coordination bonding with the ligand. Alternatively, at least 5%, 10%, 20%, 30%, 40%, 50%, 60%, 70%, 80%, 90%, or 100% of M is removably attached to at least two residues of ligand-bearing monomers via reversible metal-coordination bonding with the ligand in the ligand-bearing monomers.

The reversibility of the M coordinative binding may be achieved by any known methodology known in the art, such as the use of chelating agents (e.g., substances with higher affinity to M compared to the ligands found in the HG-PH), M-modifying conditions (e.g., light that modifies the valence state of M such that its affinity to the ligands found in the HG-PH is decreased or abolished), washes of the M/HG-PH complex with M-binding solutions, and any combination thereof.

Metal Responsive Volumetric Shrinkage:

In some embodiments, the volume of a doubly-crosslinked hydrogel is only somewhat smaller than the volume of the hydrogel prior to introduction of the coordinative metal or ion thereof. This shrinkage in volume is referred to herein as a "metal responsive volumetric shrinkage" or a "metal-response", which can be defined by percent volume shrinkage upon introduction of the coordinative metal or ion thereof to a pristine hydrogel.

It is noted herein that during the preparation of the DC-PHs according to embodiments of the present invention, the amount of M to which HG-PH is exposed to is higher than the non-washable amount. While DC-PHs are double crosslinked, the excess M may produce too many dynamic interactions that reduce modulus and limit shape recovery on the removal of stress. Partial removal of non-washable M will need to be using one of the abovementioned procedures.

In the context of a metal response, the amount of the introduced coordinative metal or ion thereof, according to some embodiments, is up to a non-washable amount thereof. The degree of metal-response, according to some embodiments, is less than 50%, less than 45%, 40%, 35%, 30%, 25%, 20%, 10%, or less than 5%.

Uses of Doubly-Crosslinked polyHIPEs:

The DC-PH presented herein, or the HG-PH prior to the introduction of a coordinating metal or an ion thereof, or an article-of-manufacturing comprising the same, can be used for or as shape-memory hydrogel, wherein the switch between one shape and another is controlled by the presence, the concentration or the absence of a coordinating metal or an ion thereof. As demonstrated in the Examples section below, the pristine and swollen HG-PH, according to embodiments of the present invention, prior to the introduction of the metal, is put into a desired shape, a coordinating metal or an ion thereof is added to the pre-shaped HG-PH to thereby form a DC-PH, according to embodiments of the present invention, and the shape is maintained even when the DC-PH is removed from a supporting medium.

A dried HG-PH or a dried DC-PH can be used as a water-uptake hydrogel.

A pristine and swollen HG-PH can be used as a metal atom/ion extracting hydrogel, and/or an ion exchange substance.

It is expected that during the life of a patent maturing from this application many relevant metal coordination DC-HP will be developed and the scope of the term metal coordination DC-HP is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the phrases "substantially devoid of" and/or "essentially devoid of" in the context of a certain substance, refer to a composition that is totally devoid of this substance or includes less than about 5, 1, 0.5 or 0.1 percent of the substance by total weight or volume of the composition. Alternatively, the phrases "substantially devoid of" and/or "essentially devoid of" in the context of a process, a method, a property or a characteristic, refer to a process, a composition, a structure or an article that is totally devoid of a certain process/method step, or a certain property or a certain characteristic, or a process/method wherein the certain process/method step is effected at less than about 5, 1, 0.5 or 0.1 percent compared to a given standard process/method, or property or a characteristic characterized by less than about 5, 1, 0.5 or 0.1 percent of the property or characteristic, compared to a given standard.

The term "exemplary" is used herein to mean "serving as an example, instance or illustration". Any embodiment described as "exemplary" is not necessarily to be construed as preferred or advantageous over other embodiments and/or to exclude the incorporation of features from other embodiments.

The words "optionally" or "alternatively" are used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the terms "process" and "method" refer to manners, means, techniques and procedures for accomplishing a given task including, but not limited to, those manners, means, techniques and procedures either known to, or readily developed from known manners, means, techniques and procedures by practitioners of the chemical, material, mechanical, computational and digital arts.

As used herein, the term "alkyl" describes an aliphatic hydrocarbon including straight chain and branched chain groups. The alkyl group may exhibit 1 to 20 carbon atoms, and preferably 8-20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. The alkyl can be substituted or unsubstituted, and/or branched or unbranched (linear). When substituted, the substituent can be, for example, an alkyl, an alkenyl, an alkynyl, a cycloalkyl, an aryl, a heteroaryl, a halo, a hydroxy, an alkoxy and a hydroxyalkyl as these terms are defined herein. The term "alkyl", as used herein, also encompasses saturated or unsaturated hydrocarbon, hence this term further encompasses alkenyl and alkynyl.

The term "alkenyl" describes an unsaturated alkyl, as defined herein, having at least two carbon atoms and at least one carbon-carbon double bond. The alkenyl may be branched or unbranched (linear), substituted or unsubstituted by one or more substituents, as described herein.

The term "alkynyl", as defined herein, is an unsaturated alkyl having at least two carbon atoms and at least one carbon-carbon triple bond. The alkynyl may be branched or unbranched (linear), and/or substituted or unsubstituted by one or more substituents, as described herein.

The terms "alicyclic" and "cycloalkyl", refer to an all-carbon monocyclic or fused ring (i.e., rings which share an adjacent pair of carbon atoms), branched or unbranched group containing 3 or more carbon atoms where one or more of the rings does not have a completely conjugated pi-electron system, and may further be substituted or unsubstituted. The cycloalkyl can be substituted or unsubstituted by one or more substituents, as described herein.

The term "heteroalicyclic" describes a monocyclic or fused ring (i.e., rings which share an adjacent pair of atoms) group having in the ring(s) one or more atoms, such as, for example, nitrogen, oxygen and sulfur and, in addition, that does not have a completely conjugated pi-electron system. Representative examples of heteroalicyclic groups include, without limitation, aziridine, oxirane, thiirane, azetidine, oxetane, thietane, pyrrolidine, oxolane, thiolane, piperidine, oxane, thiane, azepane, oxepane, thiepane and the like. The heteroalicyclic group may be substituted or unsubstituted as described for alkyl herein.

The term "aryl" describes an all-carbon aromatic monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents as described for alkyl herein.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Representative examples of heteroaryls include, without limitation, furane, imidazole, indole, isoquinoline, oxazole, purine, pyrazole, pyridine, pyrimidine, pyrrole, quinoline, thiazole, thiophene, triazine, triazole and the like. The heteroaryl group may be substituted or unsubstituted as described for alkyl herein.

The term "halo" refers to —F, —Cl, —Br or —I.

The terms "alkoxy" and "hydroxyalkyl" refer to a —OR group, wherein R is alkyl.

The terms "hydroxyl" and "hydroxy", as used herein, refer to an —OH group.

The terms "thiol", "sulfhydryl" and "sulphydryl", as used herein, refer to an —SH group.

The terms "carboxyl" and "carboxylate" refer interchangeably to a —COOH and/or —COO$^-$ group.

The terms "amine" and "amino" refer interchangeably to a —NH$_3$ group, a —NRH$_2$ group, a —NR$_2$H group or a —NR$_3$ group, wherein R is a residue or a moiety of a molecule.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental and/or calculated support in the following examples.

EXAMPLES

Reference is now made to the following examples, which together with the above descriptions illustrate some embodiments of the invention in a non-limiting fashion.

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Example 1

Double crosslinking can be used to significantly improve the mechanical properties of gels. As presented hereinbelow, doubly-crosslinked hydrogel polyHIPEs (DC-PHs), which exhibited rapid water absorption, enhanced mechanical properties, and shape memory behavior, were generated by forming metal coordination crosslinks within covalently crosslinked hydrogel polyHIPEs (HG-PHs), hydrogels formed by templating within oil-in-water high internal phase emulsions (HIPEs). The exemplary HG-PHs, according to some embodiments of the present invention, were based on acrylamide (AAm) and sodium acrylate (NaA), which provided —COO-groups, and were covalently crosslinked with N,N'-methylenebisacrylamide. The metal coordination crosslinking between the —COO— groups and Fe3+ was generated by adding FeCl3 to the HG-PHs. The interconnected macroporous structures and the rapid water absorption of the HG-PHs were preserved in the DC-PHs, while the mechanical properties, in both the swollen and dry states, were significantly enhanced. The metal coordination crosslinking was easily removed through the light-induced reduction of the Fe3+ in the presence of citric acid. The reversibility of the metal coordination crosslinking endowed the DC-PHs with a multiple-cycle shape memory behavior.

Materials:

Acrylamide (AAm as hydrogel-forming monomer), sodium acrylate (NaA as ligand-bearing monomer), N,N'-methylenebisacrylamide (MBAAm as fixed crosslinking agent), Pluronic® P-123 (surfactant HIPE stabilizer), N,N,N',N'-tetramethylethylenediamine (TEMED), citric acid and poly(vinyl alcohol) (PVA, $M_n$=15,000 as HIPE stabilizer) were from Sigma-Aldrich. Ammonium persulfate (APS) was from Fluka and all the chemicals mentioned above were used as received. The other solvents such as cyclohexane (CHX), hexane (HX), acetone and diethyl ether were analytical grade (Bio-lab). CHX, which was originally used as the internal phase, was replaced by HX when a drying protocol for minimizing shrinkage was established. The analytical grade salts originally used for metal coordination (transitory crosslinking agent) were ferric chloride hexahydrate ($FeCl_3 \cdot 6H_2O$, here referred to as $FeCl_3$), $CaCl_2$, $CuBr_2$, or $ZnCl_2$ (Aldrich). $FeCl_3$ was chosen as the most effective following a preliminary evaluation. Deionized water was used throughout all the experiments.

Hg-pH Synthesis:

The recipes for the HIPEs are listed in Table 1, and the obtained polyHIPEs are denoted as PH-X-Y, where X and Y represent the MBAAm and NaA mass fractions in the monomers, respectively. The aqueous phase to oil phase mass ratios were around 23:77, and the corresponding volume ratios were around 15:85. The typical procedures for the preparation of the PH-X-Y are described below, with HIPEs of around 50 g prepared in 100 mL beakers. PVA, P-123, APS, AAm, NaA and MBAAm were dissolved in water and stirred at 350 rpm with an overhead stirrer. The internal phase was added dropwise to the aqueous solution with constant stirring. The stirring continued for about 5 minutes after the addition of the internal phase to enhance HIPE homogeneity. TEMED was added to the as-prepared HIPEs after reducing the stirring speed to 50 rpm, and the stirring was continued for 3 additional minutes. The HIPS polymerization was carried out for 8 h at 40° C. in a water bath.

TABLE 1

Recipes for the PH-X-Y.

| | PH-16-34 | PH-16-21 | PH-16-13 | PH-5-14 | PH-2-25 |
|---|---|---|---|---|---|
| Aqueous continuous phase (wt %) | | | | | |
| Water | 14.25 | 14.25 | 14.25 | 14.25 | 14.25 |
| PVA | 0.39 | 0.39 | 0.39 | 0.39 | 0.39 |
| P-123 | 1.17 | 1.17 | 1.17 | 1.17 | 1.17 |
| AAm | 3.73 | 4.66 | 5.28 | 5.93 | 5.34 |
| NaA | 2.49 | 1.55 | 0.93 | 1.05 | 1.86 |
| MBAAm | 1.16 | 1.16 | 1.16 | 0.35 | 0.15 |
| APS | 0.12 | 0.12 | 0.12 | 0.12 | 0.12 |
| Total | 23.31 | 23.30 | 23.30 | 23.26 | 23.20 |
| Organic dispersed phase (wt. %) | | | | | |
| Hexane | 76.60 | 76.61 | 76.61 | 76.65 | 76.80 |
| TEMED (catalyst added following HIPE formation) | | | | | |
| | 0.09 | 0.09 | 0.09 | 0.09 | 0.09 |
| NaA in the monomers (wt. %) | | | | | |
| | 33.7 | 21.0 | 12.6 | 14.3 | 25.3 |
| MBAAm in the monomers (wt. %) | | | | | |
| | 15.7 | 15.7 | 15.7 | 4.8 | 2.0 |
| Aqueous phase-to-Organic phase (vol. %) | | | | | |
| | 15:85 | 15:85 | 15:85 | 15:85 | 15:85 |

In the final drying protocol, the HG-PHs were placed in a freezer at −25° C. for 3 hours before being immersed into cold (−25° C.) acetone for solvent exchange (SE). Solvent exchange was performed three times with cold acetone and twice with cold diethyl ether. Finally, the polyHIPEs were vacuum dried (VD) (dried in a vacuum oven at room temperature (RT)). The residual unreacted monomers were removed through Soxhlet extraction with water for at least 24 hours. After extraction, the water in the polyHIPEs was removed by solvent exchange at room temperature, once with acetone and then once with diethyl ether. The HG-PHs were then vacuum dried.

Bulk Hydrogel Synthesis:

Bulk hydrogels were prepared with the same monomer compositions as the HG-PHs, but without PVA, P-123 and hexane. The aqueous solutions were polymerized at 40° C. for 8 h and the resulting hydrogels were immersed in water for one week to remove unreacted monomers (the hydrogel to water weight ratio was 1:10 and the water was changed every day). The hydrogels were vacuum dried.

Double Crosslinking (DC):

The double crosslinking via metal coordination interactions was generated through immersion of the HG-PHs in a $FeCl_3$ solution (or, in the preliminary work, in solutions of various salts). Specifically, dried PH-X-Y (around 1 gram) was equilibrated in water (100 mL) for 10 hours, and then immersed in a 0.06 M aqueous $FeCl_3$ solution (100 mL) for 4 hours to obtain an $Fe^{3+}$-filled PH-X-Y (Fe-DC-X-Y). After blotting the surface, the Fe-DC-X-Y were transferred into water to remove the excess $Fe^{3+}$ and to induce the rearrangement of the $Fe^{3+}$ cations. The water was changed every half hour during the first 6 hours and then every 3 hours in the subsequent 18 hours until no color change in the water was observed. The resulting doubly-crosslinked hydrogel was denoted DC-X-Y, and it was used directly for mechanical testing or dried through solvent exchange (as described previously) for other measurements.

Decrosslinking:

A recovered HG-PH (R-PH-X-Y) was obtained by undoing the transitory crosslinking. The $Fe^{3+}$ crosslinking was undone by immersing the swollen DC-X-Y (about 0.5 g) in a 0.06 M aqueous citric acid solution (100 mL) at room temperature for 2 h while exposed to ambient room lighting.

Strong metal coordination interactions can be formed between —COO⁻ groups and metal cations [57].

Figure 6A:
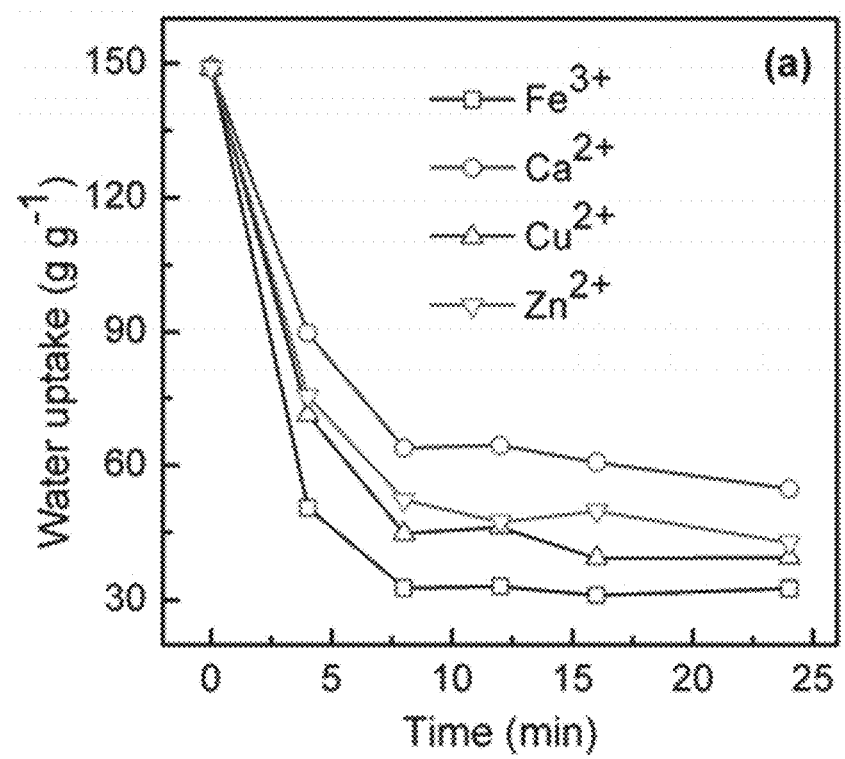
Figure 6B:
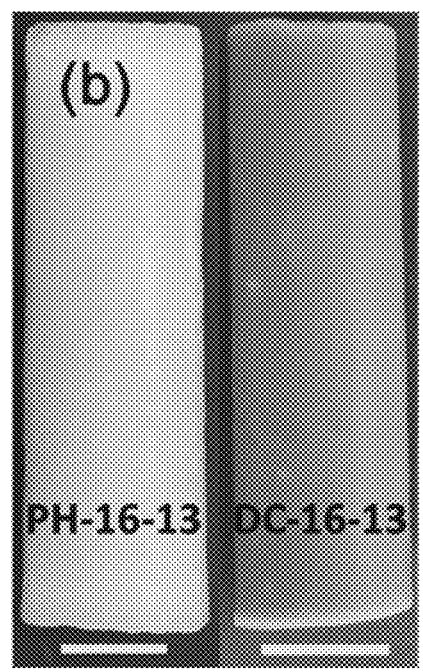

FIGS. 6A-B present various aspects of metal coordination of the DC-PHs provided herein, wherein FIG. 6A is a plot showing the reduction in the uptake within water-swollen PH-2-25 upon immersion in 0.06 M aqueous solutions of various salts ($FeCl_3$, $CaCl_2$, $CuBr_2$ or $ZnCl_2$), and FIG. 6B is a photograph of PH-16-13 and the $Fe^{3+}$ crosslinked DC-16-13 (scale bars are 10 mm).

The formation of such strong interactions with metal cations would tend to cause swollen HG-PHs to lose water and shrink. The decrease in water uptake could, therefore, be used to indicate the strength and the amount of the interactions between the hydrogel and the metal cations. Here, equilibrated, water-swollen PH-2-25 (about 3 grams), with a water uptake of 149.0 g/g, was immersed into 0.06 M aqueous solutions (150 mL) of various metal salts ($FeCl_3$, $CuBr_2$, $ZnCl_2$ or $CaCl_2$).

The uptakes in PH-2-25 decreased during immersion in all the solutions (FIG. 6A). The uptake in PH-2-25 decreased the most substantially and the most rapidly in the $FeCl_3$ solution, indicating that the $Fe^{3+}$ produces the greatest interaction with the hydrogel. Furthermore, the orange color produced by the $Fe^{3+}$ cations makes its incorporation easy to observe (FIG. 6B).

Example 2

Mechanical Characterization

The interaction between the $Fe^{3+}$ cations and the HG-PHs was studied using Fourier transform infrared (FTIR) spectroscopy in transmission (Bruker Equinox 55FTIR spectrometer). The dried samples were ground with KBr and pressed to pellets for the FTIR measurements, and the spectra were collected with a resolution of 4 cm-1. The porous structures of dried HG-PHs were observed using SEM at 20 kV (FEI Quanta 200), coating the cryogenic fracture surfaces with a thin gold-palladium layer. The average diameters of the voids (dv) and the interconnecting holes (4) were calculated from the SEM micrographs at low magnification using at least 100 voids and interconnecting holes. Compressive stress-strain tests were performed on both water-swollen and dry specimens of around 10 mm in height and 10 mm in cross-sectional diameter using an Instron 3345 with a typical compression rate of 0.5 mm/min (about 5%/min) at room temperature. The samples were compressed to an equipment-related limit of 70%. The heights of samples were recorded after releasing the stress and the height recovery was calculated. The compressive modulus (E) was calculated from the linear slope of the stress-strain curves at low strains, with the average modulus obtained from at least three tests.

Shrinkage and Density:

The organic solvents that constitute the internal phase are often removed from HG-PHs via freeze drying (FD) [40]. The extent of shrinkage upon drying can be described by the ratio of the dry HG-PH diameter to the as-synthesized HG-PH diameter ($D_R$). PH-16-13, synthesized using CHX as the internal phase, was intact following freeze drying and exhibited a $D_R$ of around 90%, indicating that freeze drying is suitable. However, the PH-5-Y, with significantly less crosslinking, partially collapsed during freeze drying ($D_R$s of around 57%). The low $D_R$s indicate that the loosely crosslinked HG-PHs were too fragile to withstand the generated drying stresses and that freeze drying is not suitable.

Instead, solvent exchange followed by vacuum drying [41] was evaluated for removal of the organic internal phase (CHX or HX). The $D_R$s of around 65% for the SE at RT of the PH-5-Y (Table 2) indicate that there was less shrinkage than for FD. PH-5-14, however, exhibited cracks that result from the high extents of deformation during SE at RT. Therefore, SE was conducted at −25° C., under which the water in the external phase is frozen and cannot undergo extensive deformation. Of course, SE at −25° C. can be used for an internal phase consisting of HX, which is liquid at −25° C., but not for an internal phase consisting of CHX, which is solid. SE at −25° C. followed by VD resulted in a $D_R$ of 70% for PH-5-14 and no visible cracks (Table 2).

TABLE 2

Effects of the internal phase solvent and of the drying protocol upon the HG-PH shape and upon the extent of diameter shrinkage.

| | | $D_R$, % | | |
|---|---|---|---|---|
| Internal phase | HG-PH | FD | SE (RT) + VD | SE (−25° C.) + VD |
| Cyclohexane | PH-16-13 | 89.5* | 89.4 | NA** |
| Hexane | PH-16-13 | NA | 89.5 | 89.6 |
| Cyclohexane | PH-5-14 | 56.8* | 64.8 (cracked) | NA** |
| Hexane | PH-5-14 | NA | 67.7 (cracked) | 70.2 |

*lost their shapes after drying (bent and/or collapsed)
**does not apply, cyclohexane is solid at −25° C.

Monolithic HG-PHs with gel contents of about 82% (Table 3) were obtained following SE at −25° C. and VD. According to the HIPE compositions, the polyHIPE densities should be around 0.11 g/cc. The measured densities were between 0.134 and 0.243 g/cc, reflecting the partial shrinkage of the HG-PHs. The porosities of the reference hydrogels ($P_{HG-T}$) and the HG-PHs ($P_{PH-T}$), as well as the porosities contributed by the void structure within HG-PHs ($P_{PH-V}$), were calculated from the densities of the dry reference hydrogels and the HG-PHs using to Equations 1-3 [42].

$$P_{HG-T} = 1 - \rho_{HG}/\rho_P \quad \text{Equation (1)}$$

$$P_{PH-T} = 1 - \rho_{PH}/\rho_P \quad \text{Equation (2)}$$

$$P_{PH-V} = 1 - \rho_{PH}/\rho_{HG} \quad \text{Equation (3)}$$

where $\rho_{HG}$, $\rho_{PH}$ and $\rho_p$ are the densities of the dry reference hydrogel, the dry HG-PH, and the polymer, respectively. The measured densities and porosities are listed in Table 3 (the polymer density was assumed to be 1.15 g/cc) [42].

TABLE 3

Properties of the PH-16-Y

| | PH-16-34 | PH-16-21 | PH-16-13 |
|---|---|---|---|
| Gel content (wt. %) | 84.6 | 82.2 | 80.1 |
| $d_v$ (μm) | 12.0 | 7.2 | 11.0 |
| $d_w$ (μm) | 2.7 | 1.3 | 2.8 |

TABLE 3-continued

Properties of the PH-16-Y

| | PH-16-34 | PH-16-21 | PH-16-13 |
|---|---|---|---|
| $\rho_{PH}$ (g/cc) | 0.134 | 0.146 | 0.243 |
| $\rho_{HG}$ (g/cc) | 0.79 | 0.80 | 0.78 |
| $P_{PH\text{-}HG}$ (%) | 5.3 | 5.5 | 10.0 |
| $P_{PH\text{-}T}$ (%) | 88.3 | 87.3 | 78.8 |
| $P_{PH\text{-}V}$ (%) | 83.0 | 81.8 | 68.8 |
| $W_{PH\text{-}T}$ (g/g) | 26.4 | 23.0 | 14.6 |
| $W_{PH\text{-}V}$ (g/g) | 6.2 | 5.6 | 2.8 |
| $W_{HG\text{-}T}$ (g/g) | 2.9 | 2.6 | 2.3 |
| $W_{PH\text{-}VE}$ (g/g) | 17.3 | 14.8 | 9.5 |
| $E_{SW}$ (kPa) | 15.6 | 25.3 | 30.7 |
| $\varepsilon_{F\text{-}SW}$ (%) | 33 | | 40 |
| $\sigma_{F\text{-}SW}$ (kPa) | 2.8 | | 11.7 |
| $\sigma_{70\text{-}sw}$ (kPa) | | 30.3 | |
| $E_D$ (MPa) | NA* | 20.8 | 40.3 |
| $\sigma_{70\text{-}D}$ (MPa) | NA* | 5.1 | 15.2 |

*broke into small pieces during drying.

The interactions between the $Fe^{3+}$ and the —COO⁻ groups are dynamic, and therefore, the concentration of $FeCl_3$ should have a significant impact on the resulting Fe-DC-X-Y. The effect of the $FeCl_3$ concentration on the Fe-DC-X-Y was studied by immersing the PH-16-Y in $FeCl_3$ solutions whose concentrations varied from 0.03 M to 0.15 M. The diameters of the resulting Fe-DC-16-Y underwent a reduction of about 10% following a 1 h immersion into the various solutions, with the colour becoming a deeper yellow with increasing $FeCl_3$ concentrations. Cracks began to appear in the Fe-DC-X-Y at $FeCl_3$ concentrations above 0.09 M, reflecting an embrittlement of the hydrogel. An optimum $FeCl_3$ concentration of 0.06 M was used to double-crosslink the PH-16-Y for further investigation. The shapes and dimensions of the PH-16-Y affected the immersion time needed to effect double-crosslinking. Four hours were enough to effect double-crosslinking within cylindrical HG-PHs with diameters of 15 mm and lengths of 40 mm, as indicated by the uniform colour throughout the Fe-DC-X-Y cross-sections. Therefore, a 4 h immersion time was used to effect double crosslinking.

Molecular Structure:

The interaction between the —COO⁻ groups of the HG-PHs and the $Fe^{3+}$ cations was investigated using FTIR.

FIG. 1 presents a comparative plot of the FTIR spectra obtained for the PH-16-Y and the DC-16-Y series.

The characteristic absorptions of the —COO⁻ groups, corresponding to antisymmetric and symmetric absorptions are at around 1562 and 1408 cm⁻¹, respectively, and these two bands are expected to be the most affected by metal coordination interactions [43]. The absorptions, from 1536 to 1542 cm⁻¹, in the PH-16-Y (FTIR spectra in FIG. 1) can be ascribed to the antisymmetric —COO— stretch combined with the secondary amide groups in MBAAm [44, 45]. This absorption wavenumber should increase with increasing NaA content in the PH-16-Y, which is in good agreement with the bands for PH-16-13 at 1536 cm-1, for PH-16-21 at 1541 cm⁻¹ and for PH-16-34 at 1542 cm⁻¹. The absorption at 1408 cm⁻¹ in the PH-16-Y can be assigned to the symmetric —COO⁻ stretch.

Binding the —COO⁻ groups with $Fe^{3+}$ cations shifts the absorption band from the 1536 to 1542 cm⁻¹ range for the PH-16-Y to 1532 cm⁻¹ for all the DC-16-Y. This absorption shift can be ascribed to the decrease in the —COO⁻ antisymmetric stretch (the $Fe^{3+}$ cations are not expected to affect the frequency of secondary amide groups). The symmetric vibration of the —COO⁻ groups appeared at 1409, 1411 and 1413 cm⁻¹ for DC-16-13, DC-16-21 and DC-16-34, respectively.

The separation between the antisymmetric and symmetric frequencies of the —COO⁻ groups ($\Delta v$) for the PH-16-Y and DC-16-Y are listed in Table 4. For PH-16-13, PH-16-21 and PH-16-34, the $\Delta v$ are 128, 134 and 137 cm⁻¹, respectively, increasing with increasing NaA content. After double cross-linking, the $\Delta v$ decrease to 123, 121 and 119 cm-1 for DC-16-13, DC-16-21 and DC-16-34, respectively. The $\Delta v$ for the DC-16-Y are smaller than those for the corresponding PH-16-Y, indicating that the $Fe^{3+}$ and the —COO⁻ groups interact through metal coordination [46].

Rearrangement:

The $Fe^{3+}$ cations within the hydrogel can dynamically exchange the —COO⁻ groups [29] and the cation concentration in the hydrogel can vary through movement in and out of the surrounding solution. To enhance uniformity, the excess $Fe^{3+}$ cations within the Fe-DC-X-Y were removed using a process that has been termed "reorganization" or "rearrangement". The Fe-DC-X-Y were immersed in deionized water which was changed every half hour during the first 6 hours and every 3 hours in the subsequent 18 hours. The color of hydrogels gradually changed from yellow to orange, indicating an increase in the percentage of the $Fe^{3+}$ within the hydrogel that are interacting with the —COO⁻ groups [29]. The resulting doubly crosslinked, emulsion-templated hydrogels were termed DC-16-Y.

Decrosslinking Results:

The removal of the metal coordination was investigated through immersion in a citric acid solution while exposed to ambient light. Light is known to induce the reduction of $Fe^{3+}$ to $Fe^{2+}$ in the presence of citric acid [47,48] and this is expected to unlock the bonds between $Fe^{3+}$ and the —COO⁻ groups and decrosslink the DC-X-Y. On immersion, the orange color in the DC-PHs gradually faded and the monoliths began to absorb water and swell. The absorption of the citric acid solution in the resulting R-PH-16-Y was not as high as the absorption of water in the original PH-16-Y since the $Fe^{2+}$ cations in the R-PH-16-Y could still bind the —COO⁻ groups. Immersing the R-PH-16-Y in water to remove the $Fe^{2+}$ cations, and changing the water several times, produced a gradual increase in water absorption. The reduction in color and increase in absorption demonstrate that the metal coordination crosslinking is reversible (transitory). Control experiments demonstrated that when the DC-16-Y were immersed in a citric acid solution, but in the absence of light, there was no obvious change in color.

TABLE 4

The antisymmetric and symmetric —COO⁻ group absorptions and their separation.

| | —COO⁻ (antisymmetric*) (cm⁻¹) | —COO⁻ (symmetric) (cm⁻¹) | $\Delta v$ (cm⁻¹) |
|---|---|---|---|
| PH-16-13 | 1536 | 1408 | 128 |
| PH-16-21 | 1541 | 1408 | 133 |
| PH-16-34 | 1542 | 1408 | 134 |
| DC-16-13 | 1532 | 1409 | 123 |
| DC-16-23 | 1532 | 1411 | 121 |
| DC-16-34 | 1532 | 1413 | 119 |

*combined with the absorption of the secondary amide groups

Figure 2A:
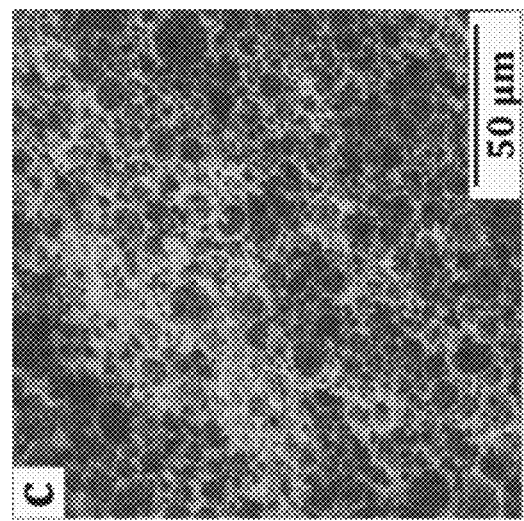
FIGS. 2A-F present SEM micrographs, showing the porous microstructure of some exemplary HG-PHs, wherein PH-16-13 is shown in FIG. 2A and FIG. 2D, PH-16-21 is shown in FIG. 2B and FIG. 2E, and PH-16-34 is shown in FIG. 2C and FIG. 2F.
Figure 2B:
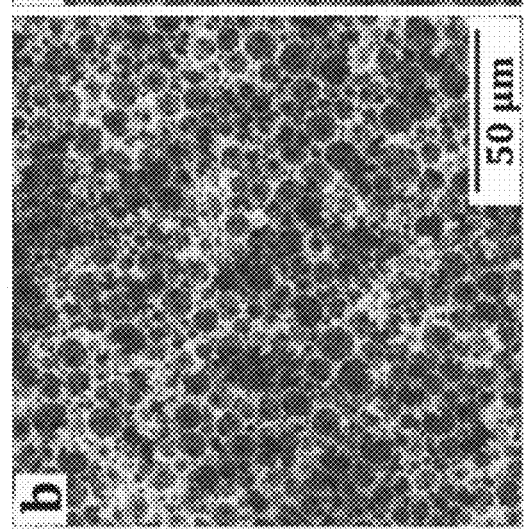
Figure 2C:
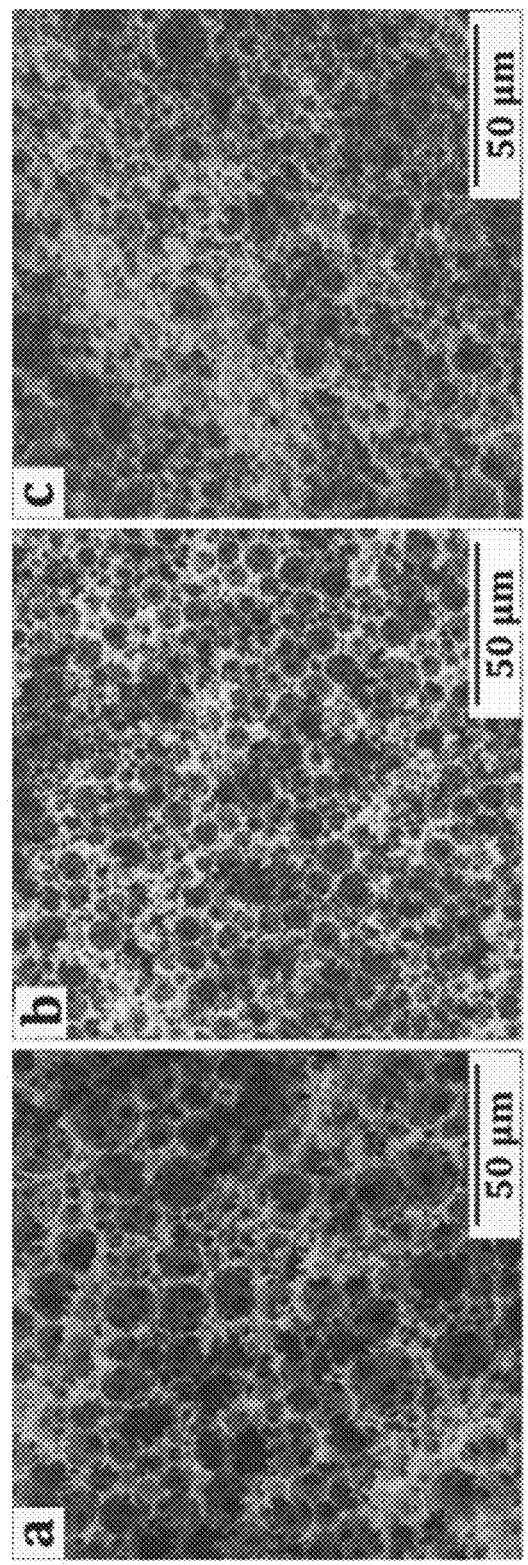
Figure 2D:
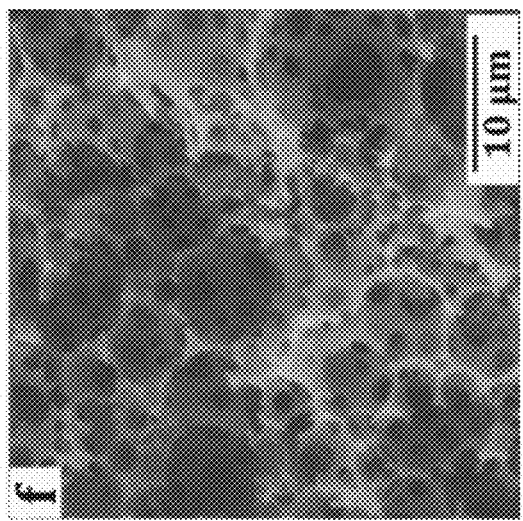
Figure 2E:
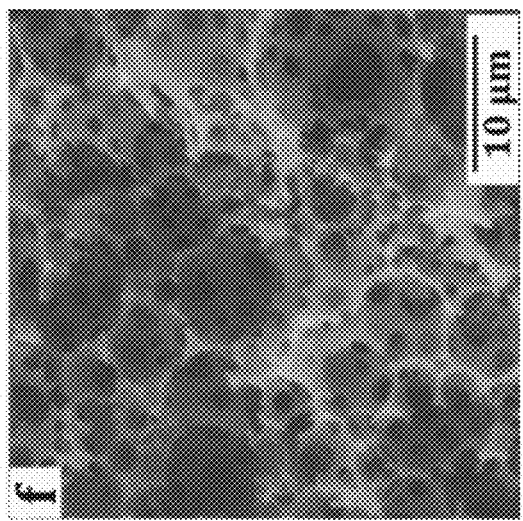
Figure 2F:
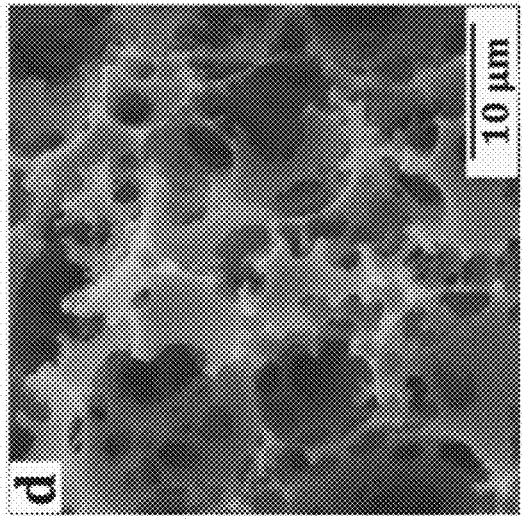

Porous Structure:

FIGS. 2A-F present SEM micrographs, showing the porous microstructure of some exemplary HG-PHs, wherein PH-16-13 is shown in FIG. 2A and FIG. 2D, PH-16-21 is shown in FIG. 2B and FIG. 2E, and PH-16-34 is shown in FIG. 2C and FIG. 2F.

Figures 3A, 3B, 3C, 3D, 3E, 3F:
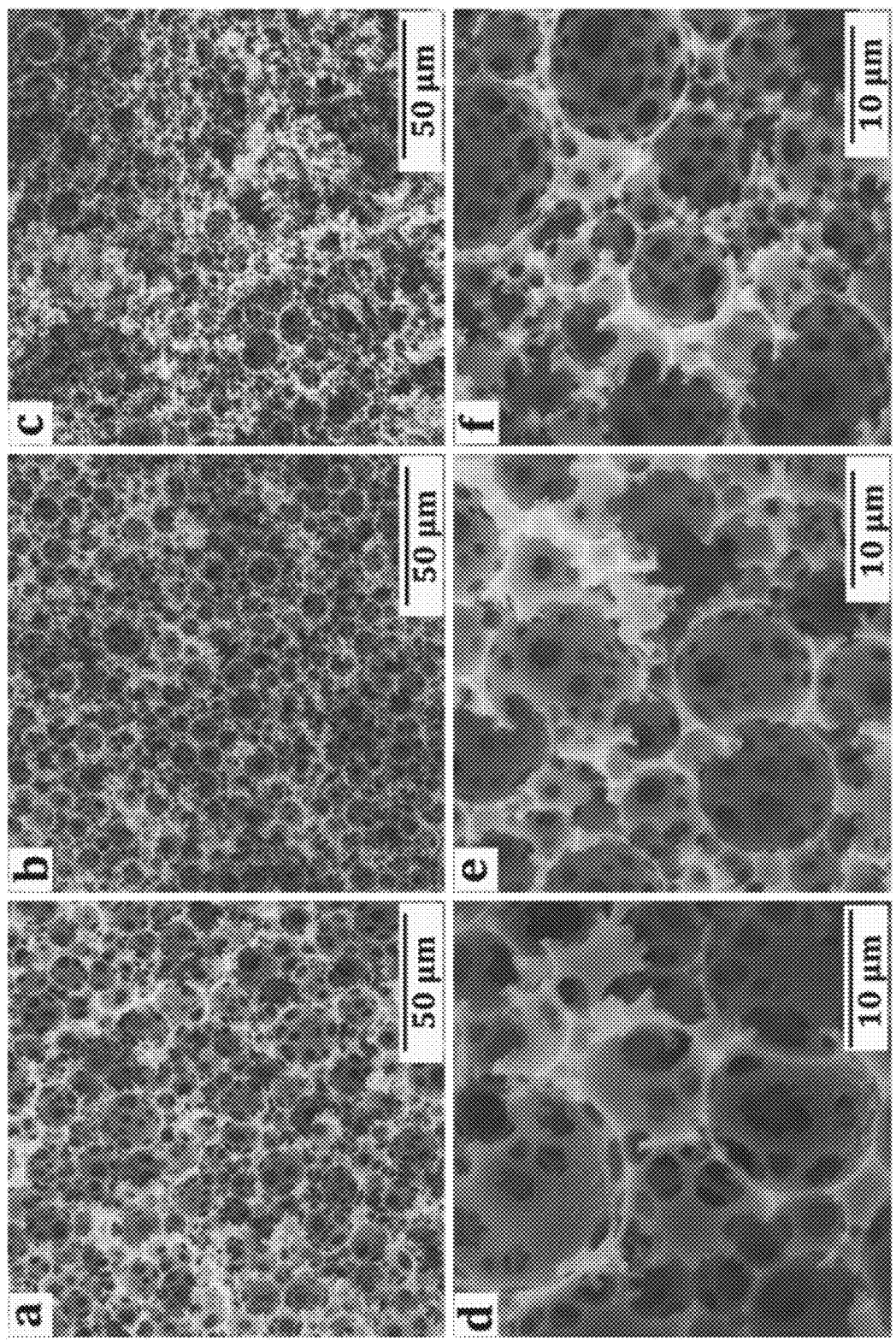
FIG. 3A-F present SEM micrographs, showing the porous microstructure of some exemplary DG-PHs, wherein DC-16-13 is shown in FIG. 3A and FIG. 3D, DC-16-21 is shown in FIG. 3B and FIG. 3E, and DC-16-34 is shown in FIG. 3C and FIG. 3F.

FIG. 3A-F present SEM micrographs, showing the porous microstructure of some exemplary DG-PHs, wherein DC-16-13 is shown in FIG. 3A and FIG. 3D, DC-16-21 is shown in FIG. 3B and FIG. 3E, and PH-16-34 is shown in FIG. 3C and FIG. 3F.

Figure 8C:
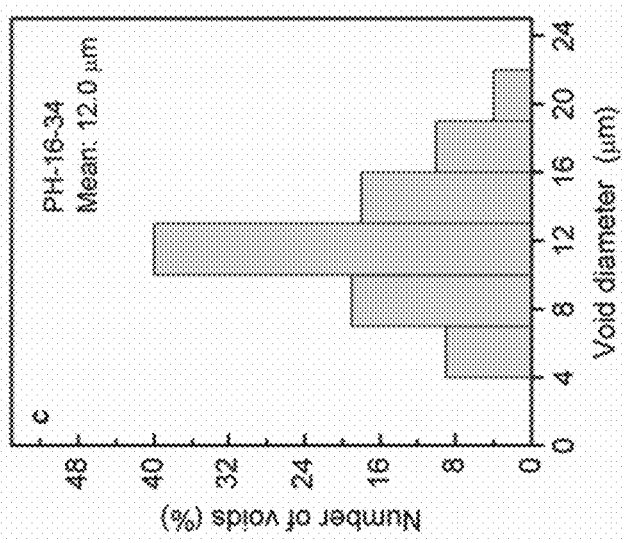
FIGS. 8A-C present void size distributions bar-plots in some exemplary HG-PHs, PH-16-13 (FIG. 8A), PH-16-21 (FIG. 8B), and PH-16-34 (FIG. 8C)
Figure 8B:
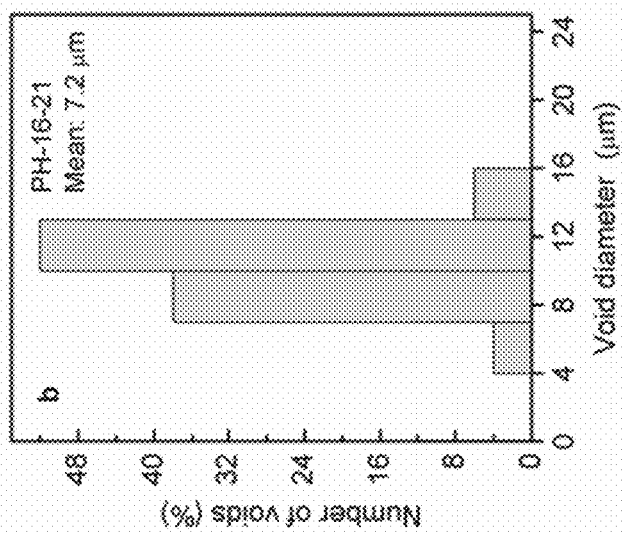
Figure 8A:
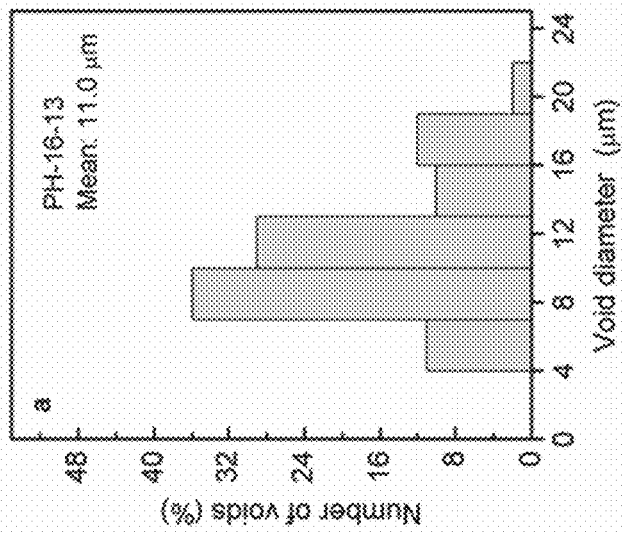

FIGS. 8A-C present void size distributions bar-plots in some exemplary HG-PHs, PH-16-13 (FIG. 8A), PH-16-21 (FIG. 8B), and PH-16-34 (FIG. 8C).

Figure 9C:
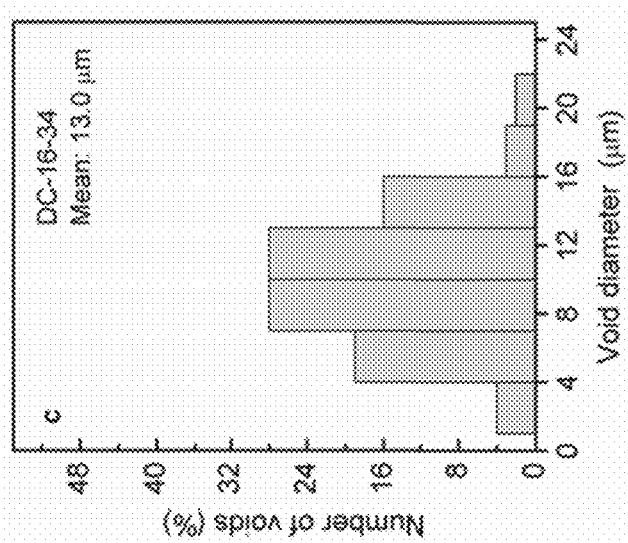
FIGS. 9A-C present void size distributions bar-plots in some exemplary DC-PHs, PH-16-13 (FIG. 9A), PH-16-21 (FIG. 9B), and PH-16-34 (FIG. 9C)
Figure 9B:
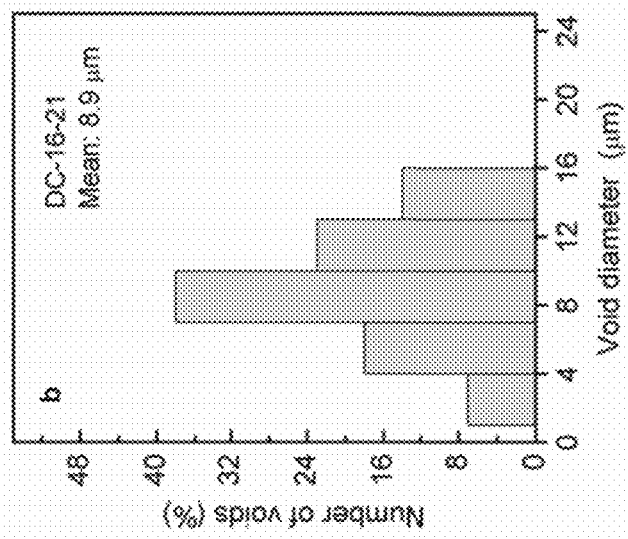
Figure 9A:
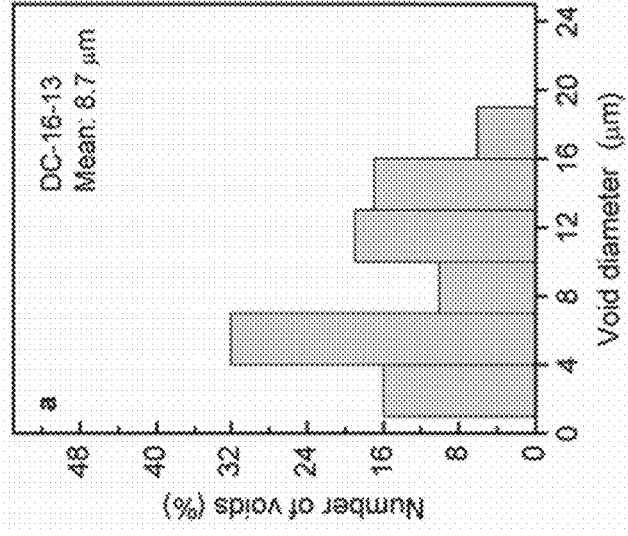

FIGS. 9A-C present void size distributions bar-plots in some exemplary DC—PHs, PH-16-13 (FIG. 9A), PH-16-21 (FIG. 9B), and PH-16-34 (FIG. 9C).

All the HG-PHs exhibited interconnected macroporous (open-cell) microstructure, as seen in SEM micrographs. The average voids diameters of around 10 µm (Table 3, with the void size distributions presented in FIGS. 8A-C) and the average interconnecting hole diameters of around 2 µm (Table 3) are similar to those of typical, surfactant-stabilized polyHiPEs [49,50]. Other work has shown significant increases in HG-PH void size following swelling and drying [26]. Here, in spite of the deswelling in an $FeCl_3$ solution, the formation of additional crosslinks, and the drying process that are involved in the generation of the DC-PHs, the interconnected macroporous (open-cell) microstructure of the HG-PHs (FIGS. 2A-F) were surprisingly well-preserved (FIGS. 3A-F). The average void sizes and interconnecting hole sizes for the DC-16-Y (Table 5, with void size distributions presented in FIGS. 9A-C) are quite similar to those of the corresponding PH-16-Y (Table 3).

TABLE 5

Properties of the DC-16-Y

| | DC-16-34 | DC-16-23 | DC-16-13 |
|---|---|---|---|
| $d_v$ (µm) | 13.0 | 8.9 | 8.7 |
| $d_w$ (µm) | 2.2 | 1.4 | 1.6 |
| $\rho_{PH}$ (g/cc) | 0.158 | 0.166 | 0.246 |
| $\rho_{HG}$ (g/cc) | 0.92 | 0.90 | 0.88 |
| $P_{PH-HG}$ (%) | 4.0 | 4.6 | 7.5 |
| $P_{PH-T}$ (%) | 86.8 | 86.2 | 79.5 |
| $P_V$ (%) | 82.8 | 81.6 | 72.0 |
| $W_{PH-T}$ (g/g) | 10.8 | 8.8 | 9.1 |
| $W_{PH-V}$ (g/g) | 5.2 | 4.9 | 2.9 |
| $W_{HG-T}$ (g/g) | 1.6 | 1.3 | 1.4 |
| $W_{PH-VE}$ (g/g) | 4.0 | 2.6 | 4.8 |
| $E_{SW}$ (kPa) | 87.2 | 64.5 | 89.5 |
| $\sigma_{70-SW}$ (kPa) | 90.2 | 98.2 | 70.1 |
| $E_D$ (MPa) | NA* | 32.8 | 80.1 |
| $\sigma_{70-D}$ (MPa) | NA* | 13.8 | 15.7 |

*broke into small pieces during drying.

Water Uptake:

The water uptake in a HG-PH ($W_{PH-T}$) consists of the water uptake in the hydrogel walls ($W_{HG-T}$), the water uptake in the original voids of the dry HG-PH ($W_{PH-V}$), as well as the water uptake in the volume generated by hydrogel-swelling-driven void expansion ($W_{PH-VE}$). $W_{PH-V}$ and $W_{PH-VE}$ were calculated using Equations 4 and 5 [42]. The water uptakes for the PH-16-Y and the DC-16-Y are listed in Table 3 and Table 5, respectively. The water uptakes of the PH-16-Y increased from 14.6 to 26.4 g/g as the NaA content increased. The mobile ion (Nat) produces an increase in the osmotic pressure, and therefore, in the water uptake of the HG-PHs [51,52]. The $W_{PH-VE}$ contributes the most to the total water uptake, as has been observed for other HG-PHs [26,42]. The water uptakes of the DC-16-Y are smaller than those of the corresponding PH-16-Y, as expected. This decrease originates in the significant reduction in the swelling, and therefore, in the $W_{PH-VE}$. The formation of a second crosslinking network restricts the macromolecular mobility, and thus, limits the hydrogel swelling and the hydrogel-swelling-driven void expansion.

$$W_{PH-V} = P_{PH-V} \rho_w / \rho_{PH} \qquad \text{Equation (4)}$$

$$W_{PH-VE} = W_{PH-T} - W_{PH-V} - W_{HG-T} \qquad \text{Equation (5)}$$

Both the PH-16-Y and the DC-16-Y exhibit rapid water absorption, reaching equilibrium water uptakes in less than one minute. The rapid water absorption reflects the high extent of capillary action in the interconnected macroporous structures (open-cell microstructure). The PH-16-Y and the DC-16-Y are, therefore, excellent candidates for applications that require the rapid absorption of aqueous solutions.

Example 3

Mechanical Behavior:

The mechanical behaviors of the swollen and dry PH-16-Y and DC-16-Y were investigated via compressive stress-strain tests.

FIGS. 4A-C present comparative compressive stress-strain curves of the PH-16-Y and DC-16-Y exemplary samples, wherein water-swollen samples are shown in FIG. 4A, dry samples are shown in FIG. 4B, and the effect of the NaA content on the modulus of the PH-16-Y and DC-16-Y in both the swollen and dry states are shown in FIG. 4C.

Typical PH-16-Y and DC-16-Y compressive stress-strain curves, swollen and dry, are shown in FIG. 4A and FIG. 4B, respectively. Usually, highly crosslinked hydrogels are expected to be brittle; however, previous work has shown that both swollen and dry HG-PHs can reach high strains without failing [26,42]. The ability to reach strains as high as 70% was attributed to the effects that the relatively low chain densities and the relatively high porosities have on the deformation mechanisms.

Figure 7A:
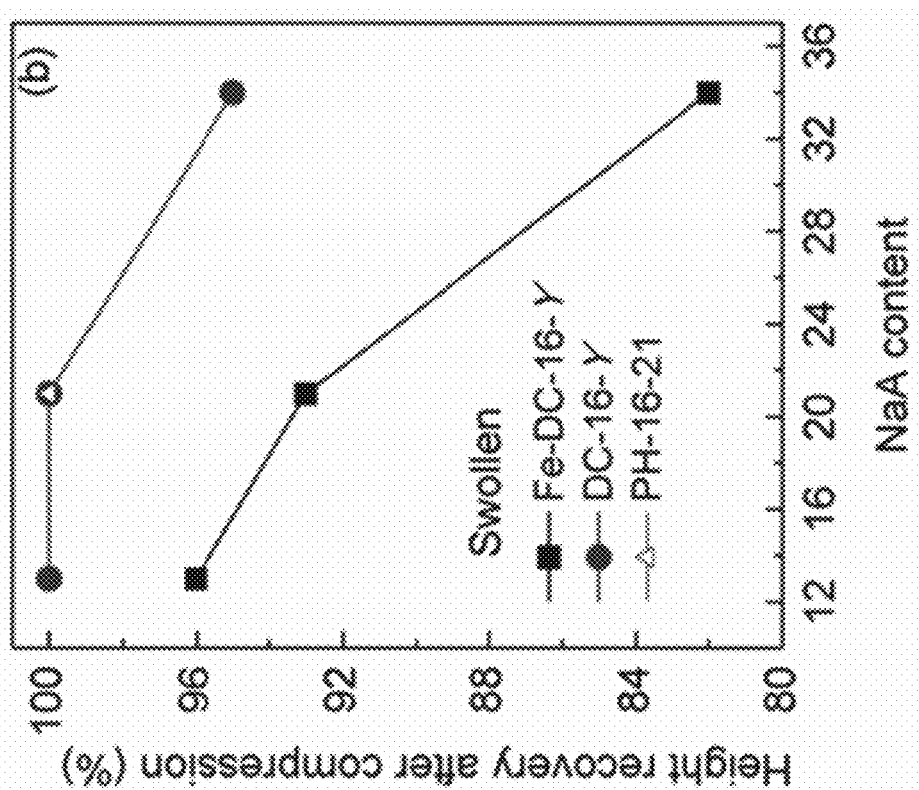
FIGS. 7A-B present compressive stress-strain curves of the swollen PH-16-21, Fe-DC-16-21, and DC-16-21 (FIG. 7A), and height recovery following stress removal in PH-16-21 and in the Fe-DC-16-Y and DC-16-Y (FIG. 7B)
Figure 7B:
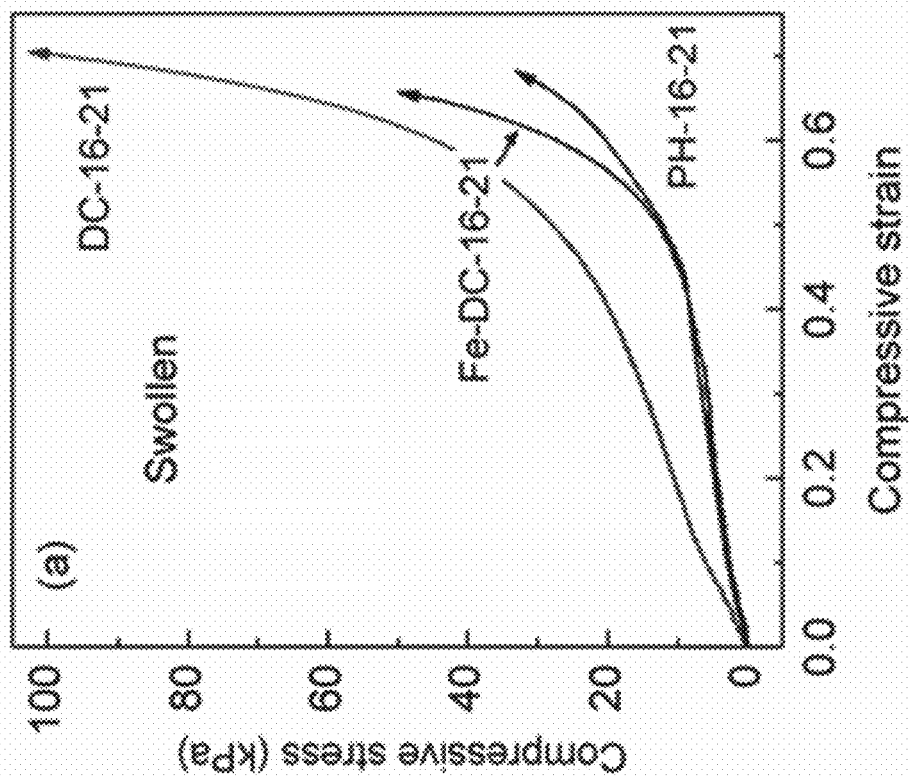

FIGS. 7A-B present compressive stress-strain curves of the swollen PH-16-21, Fe-DC-16-21, and DC-16-21 (FIG. 7A), and height recovery following stress removal in PH-16-21 and in the Fe-DC-16-Y and DC-16-Y (FIG. 7B).

The mechanical behaviors are highly dependent on both the NaA content and the nature and extent of crosslinking. The water-swollen PH-16-Y are flexible, but relatively fragile, with both PH-16-13 and PH-16-34 failing at about 37% strain. The formation of additional crosslinking enhanced the robustness of these HG-PHs. The changes in the mechanical behaviors are obvious from a comparison of the compressive stress-stain curves (seen for PH-16-21, Fe-DC-16-21, and DC-16-21 in FIG. 7A). The compressive moduli of the Fe-DC-X-Y are higher than those of the corresponding HG-PHs and they do not fail up to strains of 70%. The Fe-DC-16-21, however, do not recover their original heights following compression, with the height recovery decreasing, from 96% to 82%, with increasing NaA content (as seen in FIG. 7A). This relatively low extent of shape recovery in the Fe-DC-16-21 may result from dynamic interactions in the presence of excess $Fe^{3+}$. The dynamic interactions can shift the crosslinking to accommodate the new shape imposed by the deformation imposed during compression. Removal of the excess $Fe^{3+}$ during the generation of the DC-X-Y could limit the rearrangement and promote the recovery of the original height upon the removal of the stress.

All the water-swollen DC-16-Y exhibited typical polyHIPE compressive behaviors (FIG. 4A): a linear region at low strains, a stress plateau region at intermediate strains, and a densification region accompanied by a rapid increase in stress at high strains [53]. The DC-16-Y are more robust than the corresponding PH-16-Y and no failure was observed up to 70% strain. Interestingly, the DC-16-Y were stiffer than the corresponding Fe-DC-16-Y. The moduli of DC-16-21 and Fe-DC-16-21 were 64.5 and 50.0 kPa, respectively, and the stresses at 70% strain were 98.2 and 45.3 kPa, respectively. This enhancement in rigidity can be attributed to the limitation on dynamic exchange in the absence of excess $Fe^{3+}$ and the increase in the tridentate content [29].

The effects of the NaA content and the addition of a second crosslinking network on the moduli of the PH-16-Y and DC-16-Y, in both the swollen and dry states, are shown in FIG. 4C. The moduli of the swollen PH-16-Y and DC-16-Y decreased with increasing NaA content, reflecting the higher water uptake. Swollen DC-16-Y exhibited significantly higher moduli than the corresponding swollen PH-16-Y, reflecting the increase in stiffness imparted by the additional crosslinking. Double crosslinking increased the modulus four fold, from 15.6 kPa for swollen PH-16-34 (26.4 g/g uptake) to 87.2 kPa for swollen DC-16-34 (10.8 g/g uptake). The Dry DC-16-13 exhibited a relatively high compressive modulus, about 80 MPa, compared to about 40 MPa for the dry PH-16-13. Very few dry HG-PHs have exhibited such high compressive moduli [25].

Water was squeezed out from the swollen PH-16-13, PH-16-21, and DC-16-Y during compression. The water was completely reabsorbed, however, once the stress was released. No water was squeezed out during the compression of PH-16-34, indicating that the water was tightly bound to the polymer owing to its high NaA content. DC-16-13 and DC-16-21 recovered their original heights, and DC-16-34 recovered 95% of its original height, after they reabsorbing the water (FIG. 7B), demonstrating that removing the excess $Fe^{3+}$ from the Fe-DC-16-Y enhanced shape recovery.

The compressive behaviors of all the dry HG-PHs (FIG. 4B) are similar to those of typical polyHIPEs. The mechanical properties of the dry HG-PHs were also enhanced through double crosslinking. The moduli and stresses at 70% strain of the dry DC-16-Y were higher than those of the corresponding dry PH-16-Y, reflecting the presence of the additional crosslinking.

Shape Memory:

FIGS. 5A-E show various aspects of the shape-memory attribute, characterizing the composition-of-matter provided herein, wherein FIGS. 5A-D are photographs of shape fixation and release (10 mm scale bars) showing a highly deformable PH-2-25 (FIG. 5A), the fixed helical shape of DC-2-25 (FIG. 5B), DC-2-25 maintaining its fixed helical shape under its own weight (FIG. 5C), shape-released R-PH-2-25 (FIG. 5D), and showing the increase in the R-PH-2-25 mass and length with the time of immersion in a 0.06 M aqueous solution of citric acid (FIG. 5E).

The dynamic nature of metal coordination crosslinking [54,55] in the DC-PHs can be used to produce shape memory behavior. The relatively low degree of MBAAm crosslinking in PH-2-25 makes it highly deformable. A 4 mm diameter cylinder of PH-2-25 could be folded with a fold radius of less than 5 mm without failure (FIG. 5A), demonstrating this high deformability. A temporary helical shape was imposed on the PH-2-25 cylinder by wrapping it around a 5 mm diameter rod, immersing the wrapped rod in a 0.06 M aqueous $FeCl_3$ solution for 4 hours, and then transferring the Fe-DC-2-25 helix into deionized water to remove the excess $Fe^{3+}$. After being removed from the water, the additional transitory crosslinking in the resulting DC-2-25 was enough to preserve the imposed, temporary helical shape (FIG. 5B). In addition, the imposed helical shape and the length of the helix were maintained under its own weight (FIG. 5C). This, the first example of shape memory in HG-PHs, is quite different from the shape memory effects reported for hydrophobic, crystallizable polyHIPEs [13,56]. Here, the shape fixation was through reversible crosslinking, rather than through reversible crystallization.

The fixed shape of DC-2-25 was removed through the reduction of the $Fe^{3+}$ cations. DC-2-25 gradually lost its helical shape and its orange color faded during immersion in a 0.06 M aqueous solution of citric acid under ambient light for 1 hour, and the resulting recovered HG-PH was termed R-PH-2-25. Quantitatively describing this type of shape memory effect using a shape fixity ratio and a shape recovery ratio is not straightforward since the PH-2-25 was too flexible (FIG. 5D). Instead, the shape memory behavior was quantitatively characterized through the increase in the mass (from absorbed solution) and the increase in the sample length (FIG. 5E). Both the mass and length increased with time and reached their equilibrium values within 50 minutes, whereupon the imposed temporary shape was completely released. The mass of R-PH-2-25 did not reach that of the original swollen PH-2-25 since the $Fe^{2+}$ cations present in R-PH-2-25 can still effect some crosslinking and the presence of citric acid can also suppress uptake. The complete reversibility of the metal coordination crosslinking was demonstrated by performing multiple shape fixation and release cycles. Three fixation and release cycles were performed with PH-2-25 and no obvious changes between the cycles were observed.

Example 4

DC-PHs Containing Imidazole Groups:

Imidazole group may coordinate with $Zn^{2+}$, $Cu^{2+}$ and $Co^{2+}$ to form a metal coordination complex. Each $Zn^{2+}$, $Cu^{2+}$ and $Co^{2+}$ ion can coordinate with 4, 4-5 and 6 imidazole groups, respectively, leading to a tunable mechanical behaviors of as-formed DC-PHs. These DC-PHs have demonstrated rapid absorption of methyl orange and fast green dyes from aqueous solutions.

Materials:

In the formation of the polyHIPE 1-vinylimidazole (VIm) was used as an ligand-bearing monomer (imidazole moiety), acrylamide (AAm) was used as a hydrogel-forming monomer, and N,N'-methylenebisacrylamide (MBAAm) was used as a cross-linking agent, with hexane as an organic solvent in the internal phase, and ammonium persulfate (APS) as the initiator.

Hg-pH Synthesis:

The HG-PHs were prepared using the following mixtures, whereas the reaction followed the steps of forming the HIPE, polymerizing the HIPE into a polyHIPE, solvent exchange, and extraction using ethanol and trimethylamine. Table 6 presents the formulation of the pre-polymerization mixture, PH-X-Y, wherein X denotes volume fraction of dispersed phase, and Y denotes the vinyl imidazole content.

TABLE 6

| | IPH-80-10 | IPH-80-20 | IPH-80-30 | IPH-75-30 | IPH-85-30 |
|---|---|---|---|---|---|
| Continuous aqueous phase | | | | | |
| P-123 | 1.00 | 1.00 | 1.00 | 1.24 | 0.74 |
| Water | 12.40 | 11.86 | 11.32 | 13.96 | 8.34 |
| AAm | 4.83 | 4.22 | 3.61 | 4.46 | 2.67 |
| VIn | 0.60 | 1.21 | 1.81 | 2.23 | 1.34 |
| HC1 | 0.54 | 1.08 | 1.63 | 2.00 | 1.20 |
| MB A Am | 0.60 | 0.60 | 0.60 | 0.74 | 0.45 |
| APS | 0.17 | 0.17 | 0.17 | 0.29 | 0.18 |
| Total | 20.14 | 20.14 | 20.14 | 24.92 | 14.92 |
| Dispersed organic phase | | | | | |
| Hexane | 79.69 | 79.69 | 79.69 | 74.79 | 84.90 |
| TEMED | 0.17 | 0.17 | 0.17 | 0.29 | 0.18 |
| VIm fraction (wt. %) | | | | | |
| | 10 | 20 | 30 | 30 | 30 |

Figures 10A, 10B, 10C, 10D, 10E:
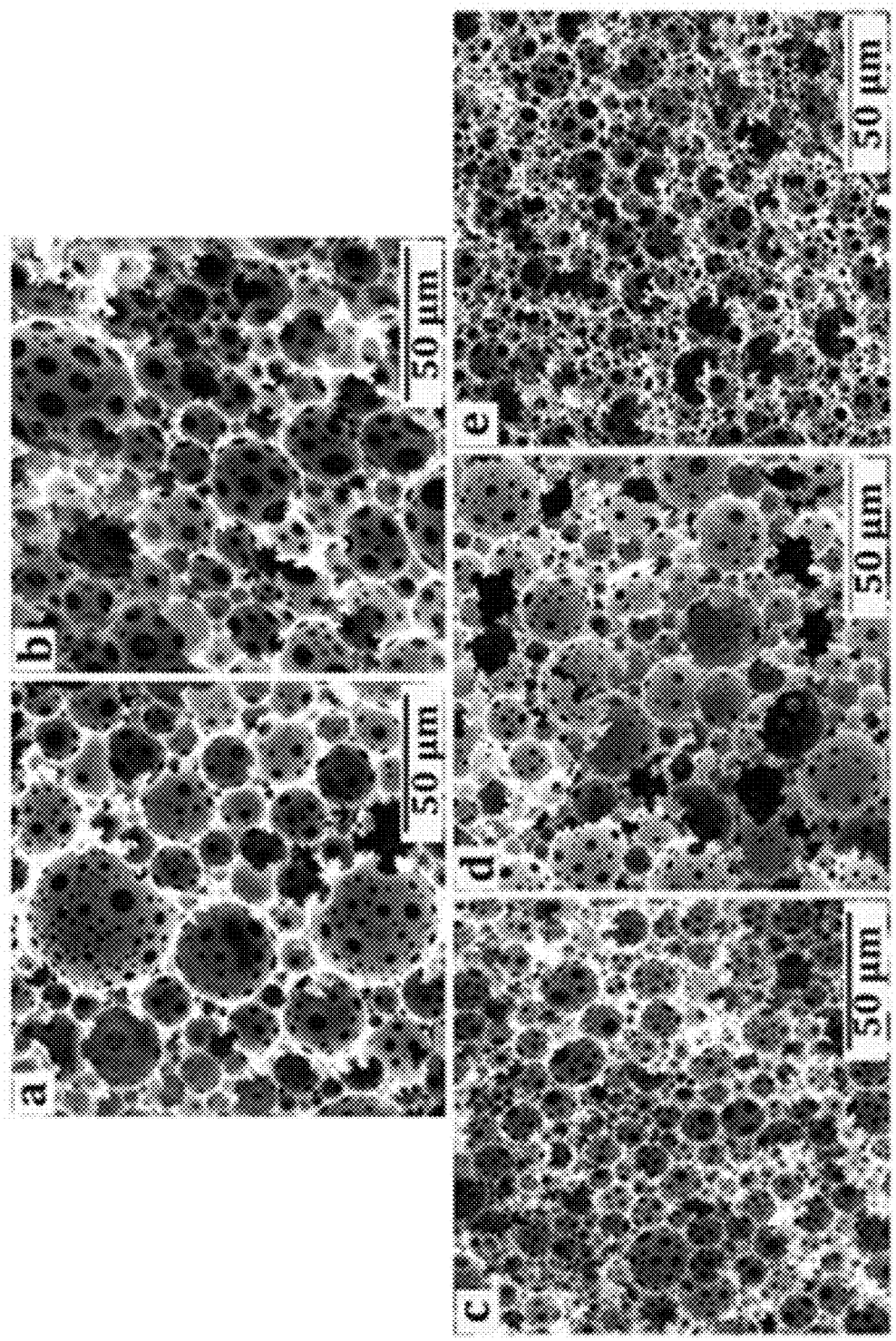
FIGS. 10A-E present SEM micrographs showing the macroporous structures of some exemplary DC-PHs, according to embodiments of the present invention, whereas IPH-80-10 is shown in FIG. 10A, IPH-80-20 in FIG. 10B, IPH-80-30 in FIG. 10C, IPH-75-30 in FIG. 10D, and IPH-85-30 in FIG. 10E.

Results:

FIGS. 10A-E present SEM micrographs showing the macroporous structures of some exemplary DC-PHs, according to embodiments of the present invention, whereas IPH-80-10 is shown in FIG. 10A, IPH-80-20 in FIG. 10B, IPH-80-30 in FIG. 10C, IPH-75-30 in FIG. 10D, and IPH-85-30 in FIG. 10E.

As can be seen in FIGS. 10A-E, in the samples characterized by having the same internal phase content (80 wt % FIGS. 10A-C), the size of the voids decreases significantly with increasing VIm content in the monomers (10, 20, 30 wt %, respectively). In FIGS. 10C-E the samples are characterized by having the same VIm content in the monomers (30 wt %) and different internal phase contents (80, 75, 85 wt %, respectively), the void diameter decreases with increasing internal phase content.

Figure 11:
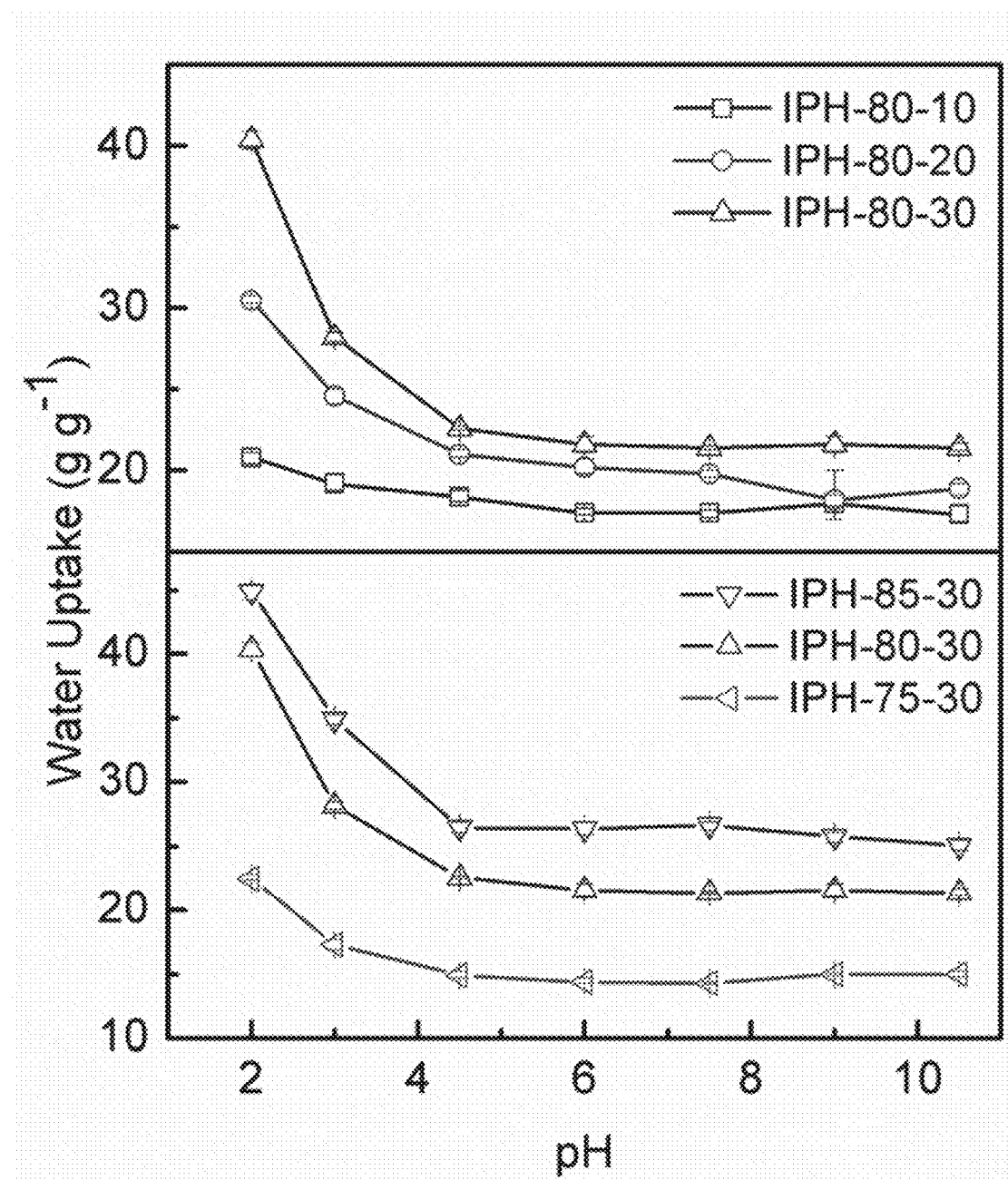
FIG. 11 presents comparative plots of the water uptake as a function of pH, as recorded for exemplary compositions-of-matter, according to some embodiments of the present invention, having a cationic ligand (imidazole)

FIG. 11 presents comparative plots of the water uptake as a function of pH, as recorded for exemplary compositions-of-matter, according to some embodiments of the present invention, having a cationic ligand (imidazole).

As can be seen in FIG. 11, as opposed to the other polyHIPEs that were based on anionic monomers where the water uptake increased with increasing pH as the polymer becomes charged, here, in the case of cationic residue side-chain (imidazolium), the water uptake increases with decreasing pH as the cationic monomer becomes charged (see, top part of FIG. 11). The uptake increases with increasing VIm content (constant 80 wt % internal phase content; see bottom part of FIG. 11), and the uptake increases with increasing internal phase content (constant 30 wt % VIm content).

Figure 12:
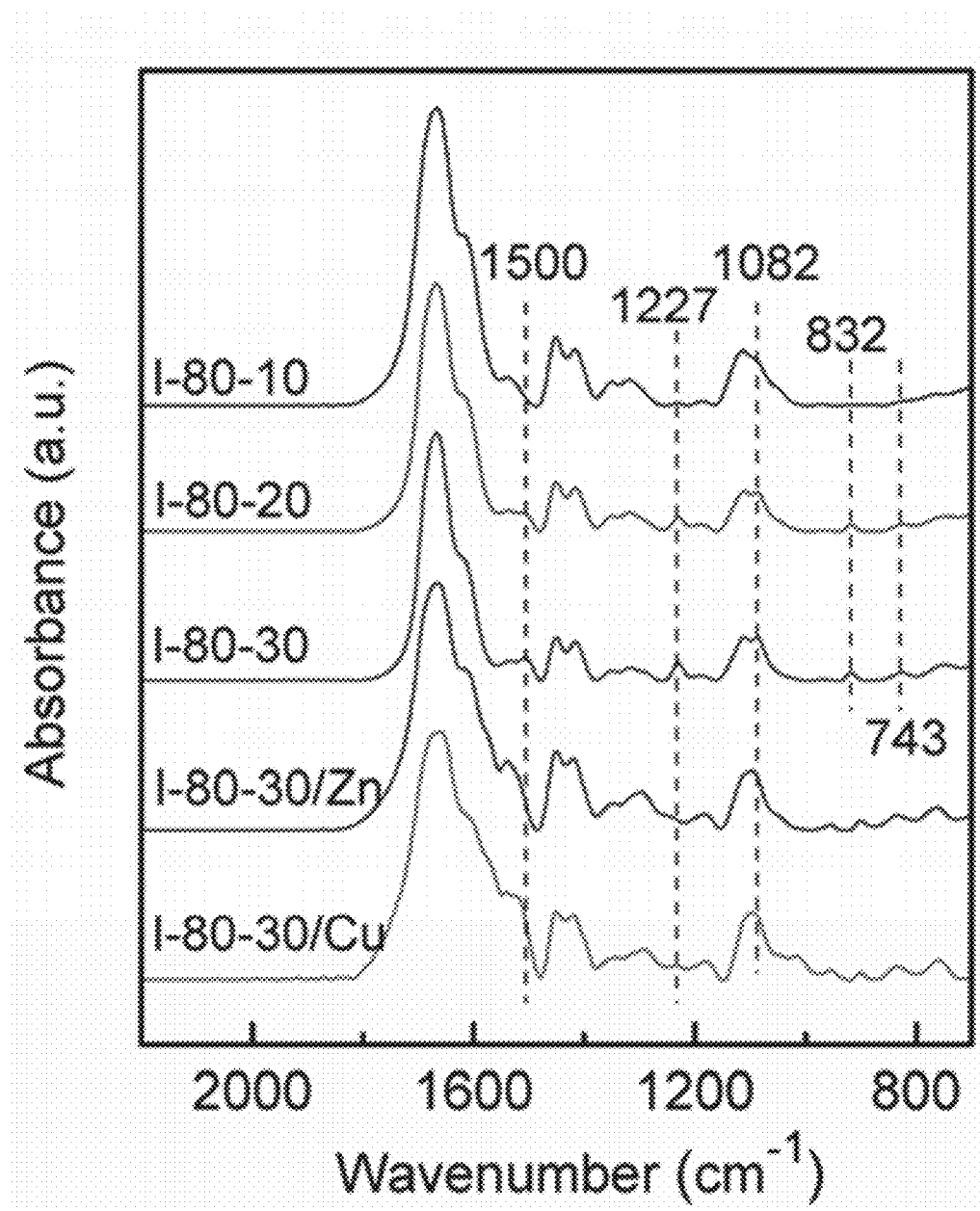
FIG. 12 presents comparative FTIR spectra for constant 80 wt % internal phase content and different VIm contents (10, 20, 30 wt %) with no "double crosslinking" and for constant 80 wt % internal phase content and constant 30 wt % VIm content after effecting "double crosslinking" with either zinc ions or copper ions.
Figure 13A:
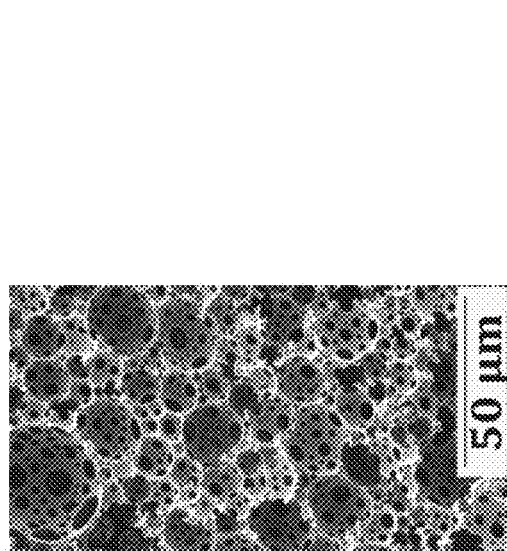
FIGS. 13A-E present SEM micrographs, showing the porous microstructure of IPH-80-10 (FIG. 13A), IPH-80-20 (FIG. 13B), IPH-80-30 (FIG. 13C), IPH-75-30 (FIG. 13D) and IPH-85-30 (FIG. 13E), after double crosslinking with copper ions.
Figure 13B:
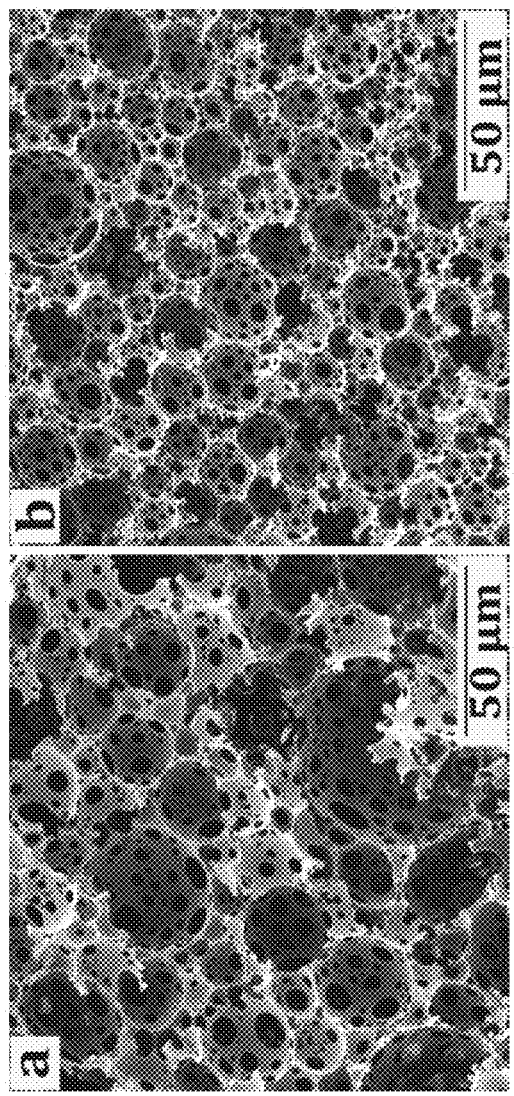
Figure 13C:
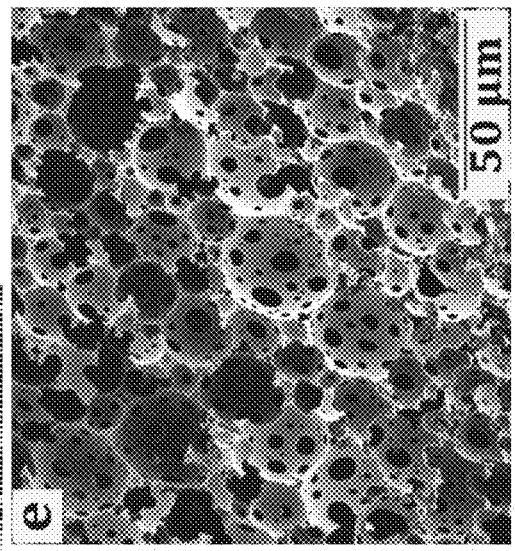
Figure 13D:
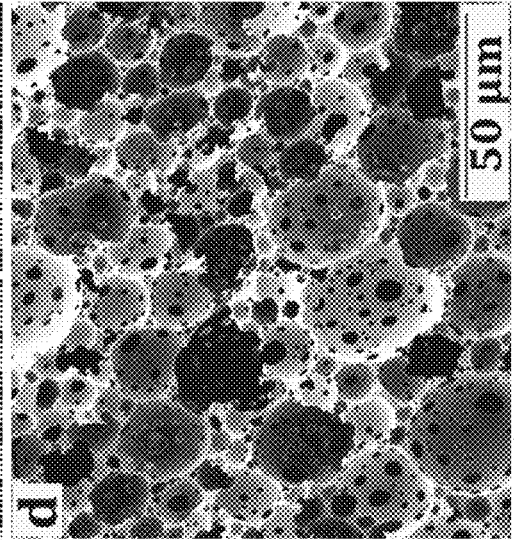
Figure 13E:
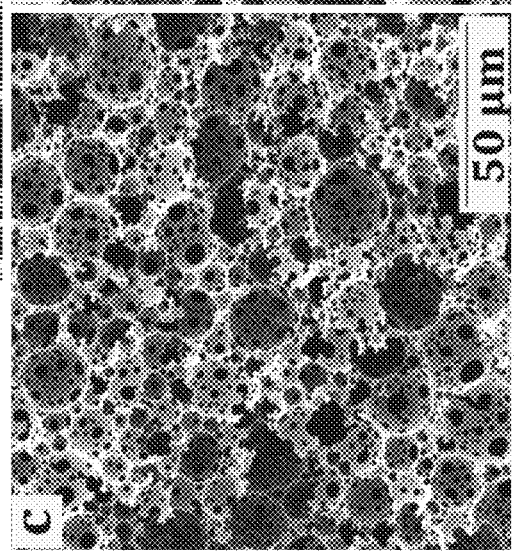

FIG. 12 presents comparative FTIR spectra for constant 80 wt % internal phase content and different VIm contents (10, 20, 30 wt %) with no "double crosslinking" and for constant 80 wt % internal phase content and constant 30 wt % VIm content after effecting "double crosslinking" with either zinc ions or copper ions.

As can be seen in FIG. 12, double-crosslinking produces a change in the band at 1500 cm$^{-1}$ that is associated with the stretching of the imidazole ring.

FIGS. 13A-E present SEM micrographs, showing the porous microstructure of IPH-80-10 (FIG. 13A), IPH-80-20 (FIG. 13B), IPH-80-30 (FIG. 13C), IPH-75-30 (FIG. 13D) and IPH-85-30 (FIG. 13E), after double crosslinking with copper ions.

As can be seen in FIGS. 13A-E, the double-crosslinking step does not affect the porous structure in all sample, regardless of the VIm and/or internal phase contents.

FIGS. 14A-D present compressive tress-strain curves, showing the mechanical behavior of the water-swollen polyHIPEs without double-crosslinking compared with samples that underwent double-crosslinking using either zinc or copper ions (internal phase contents of 80 wt % in FIGS. 14A-B, and internal phase contents of 75 wt % or 85 wt % in FIG. 14C and FIG. 14D, respectively), whereas the numbers near each of the curves indicates the moduli in kPa.

Figure 14B:
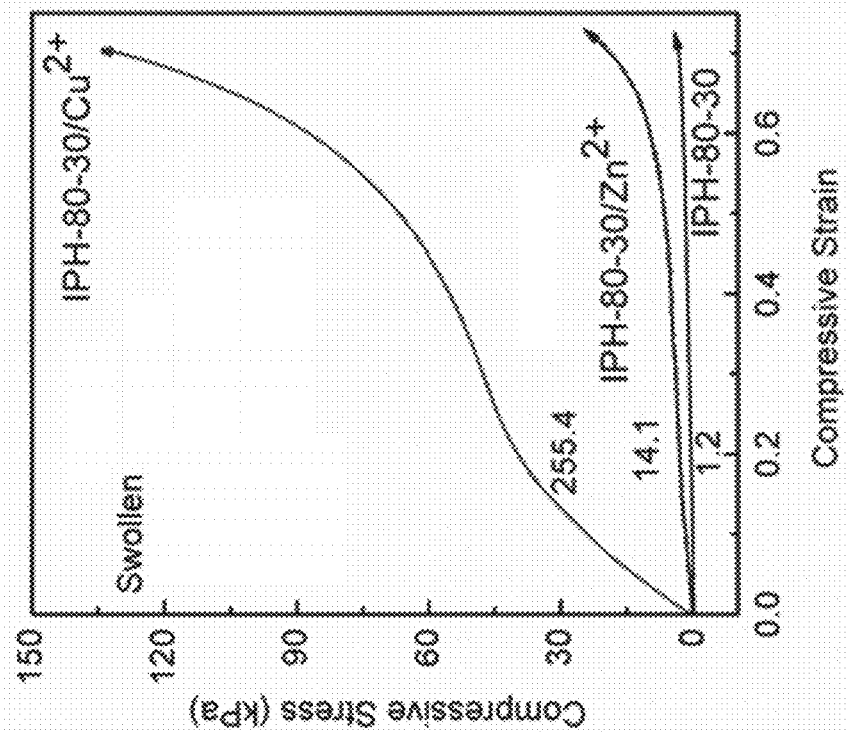
FIGS. 14A-D present compressive tress-strain curves, showing the mechanical behavior of the water-swollen polyHIPEs without double-crosslinking compared with samples that underwent double-crosslinking using either zinc or copper ions (internal phase contents of 80 wt % in FIGS. 14A-B, and internal phase contents of 75 wt % or 85 wt % in FIG. 14C and FIG. 14D, respectively), whereas the numbers near each of the curves indicates the moduli in kPa.
Figure 14A:
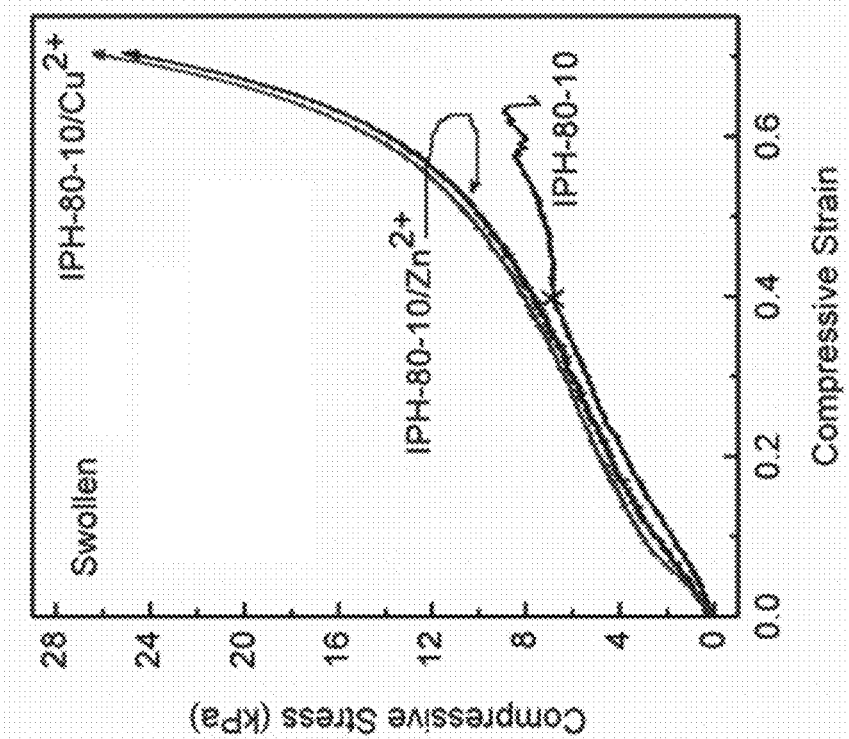
Figure 14C:
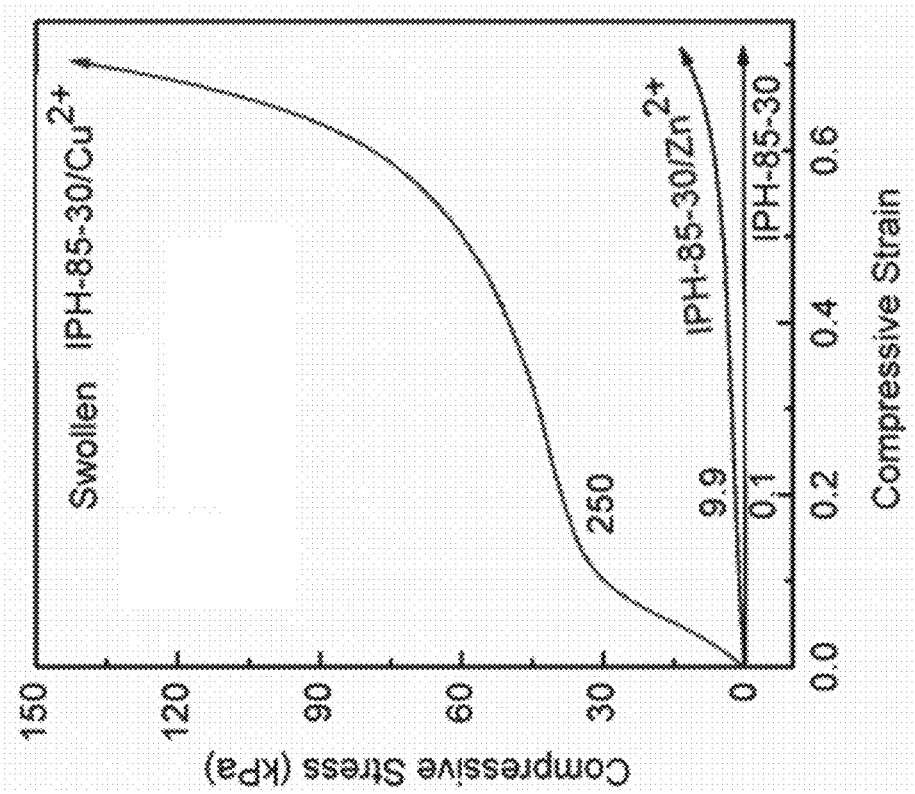
Figure 14D:
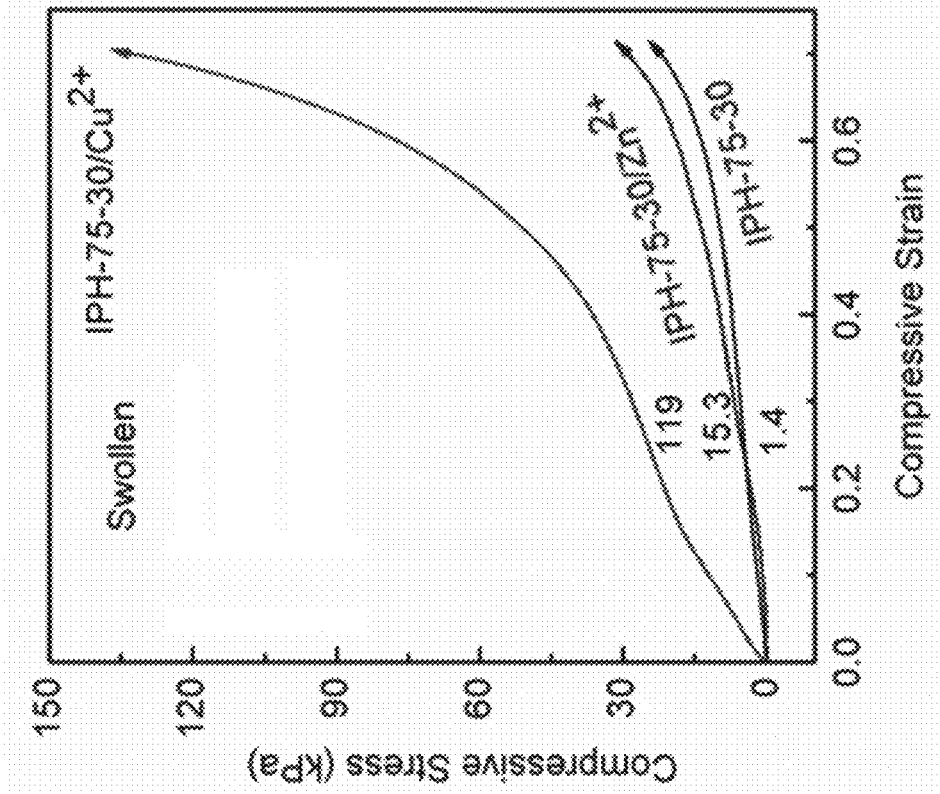

As can be seen in FIGS. 14A-D, for the low VIm content (10%; FIG. 14A) without double crosslinking the hydrogel is brittle and fails at 40% strain. Double crosslinking enhances the robustness of the hydrogel polyHIPEs which reach 70% strain without failing. For the high VIm content (30%; FIGS. 14B-D), all the samples were robust and reach 70% strain without failing. It is also discernable from the results that copper ions are more effective at double crosslinking compared to zinc ions.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

REFERENCES

[1] M. S. Silverstein, PolyHIPEs: Recent advances in emulsion-templated porous polymers, Prog. Polym. Sci. 39 (1) (2014) 199-234.

[2] M. S. Silverstein, Emulsion-templated porous polymers: A retrospective perspective, Polymer 55 (1) (2014) 304-320.

[3] M. S. Silverstein, Emulsion-templated polymers: Contemporary contemplations, Polymer (2017), under revision.

[4] M. Bokhari, R. J. Carnachan, S. A. Przyborski, N. R. Cameron, Emulsion-templated porous polymers as scaffolds for three dimensional cell culture: effect of synthesis parameters on scaffold formation and homogeneity, J. Mater. Chem. 17 (38) (2007) 4088-4094.

[5] S. Zhou, A. Bismarck, J. H. G. Steinke, Interconnected macroporous glycidyl methacrylate-grafted dextran hydrogels synthesised from hydroxyapatite nanoparticle stabilised high internal phase emulsion templates, J. Mater. Chem. 22 (36) (2012) 18824-18829

[6] Y. Hua, S. Zhang, Y. Zhu, Y. Chu, J. Chen, Hydrophilic Polymer Foams with Well-Defined Open-Cell Structure Prepared from Pickering High Internal Phase Emulsions, J. Polym. Sci. A Polym. Chem. 51 (10) (2013) 2181-2187.

[7] W. Yi, H. Wu, H. Wang, Q. Du, Interconnectivity of Macroporous Hydrogels Prepared via Graphene Oxide-Stabilized Pickering High Internal Phase Emulsions, Langmuir 32 (4) (2016) 982-990.

[8] D. Pahovnik, J. Majer, E. agar, S. Kovačič, Synthesis of hydrogel polyHIPEs from functionalized glycidyl methacrylate, Polym. Chem. 7 (32) (2016) 5132-5138.
[9] Q. Hou, D. W. Grijpma, J. Feijen, Porous polymeric structures for tissue engineering prepared by a coagulation, compression moulding and salt leaching technique, Biomaterials 24 (11) (2003) 1937-1947.
[10] A. S. Hayward, N. Sano, S. A. Przyborski, N. R. Cameron, Acrylic-Acid-Functionalized PolyHIPE Scaffolds for Use in 3D Cell Culture, Macromol. Rapid Commun. 34 (23-24) (2013) 1844-1849.
[11] N. C. Grant, A. I. Cooper, H. Zhang, Uploading and temperature-controlled release of polymeric colloids via hydrophilic emulsion-templated porous polymers, ACS Appl. Mater. Interfaces 2 (5) (2010) 1400-1406.
[12] Y. Zhu, Y. Zheng, F. Wang, A. Wang, Monolithic supermacroporous hydrogel prepared from high internal phase emulsions (HIPEs) for fast removal of Cu2+ and Pb2+, Chem. Eng. J. 284 (2016) 422-430.
[13] C. Warwar Damouny, M. S. Silverstein, Hydrogel-filled, semi-crystalline, nanoparticle-crosslinked, porous polymers from emulsion templating: Structure, properties, and shape memory, Polymer 82 (2016) 262-273.
[14] S. Liu, M. Jin, Y. Chen, H. Gao, X. Shi, W. Cheng, L. Ren, Y. Wang, High internal phase emulsions stabilised by supramolecular cellulose nanocrystals and their application as cell-adhesive macroporous hydrogel monoliths, J. Mater. Chem. B 5 (14) (2017) 2671-2678.
[15] T. Zhang, Z. Xu, H. Gui, Q. Guo, Emulsion-templated, macroporous hydrogels for enhancing water efficiency in fighting fires, J. Mater. Chem. A 5 (21) (2017) 10161-10164.
[16] C. Youssef, R. Backov, M. Treguer, M. Birot, H. Deleuze, Preparation of remarkably tough polyHIPE materials via polymerization of oil-in-water HIPEs involving 1-vinyl-5-aminotetrazole, J. Polym. Sci. A Polym. Chem. 48 (13) (2010) 2942-2947.
[17] H. Tai, A. Sergienko, M. S. Silverstein, High internal phase emulsion foams: Copolymers, and interpenetrating polymer networks, Polym. Eng. Sci. 41 (9) (2001) 1540-1552.
[18] M. S. Silverstein, H. Tai, A. Sergienko, Y. Lumelsky, S. Pavlovsky, PolyHIPE: IPNs, hybrids, nanoscale porosity, silica monoliths and ICP-based sensors, Polymer 46 (17) (2005) 6682-6694.
[19] H. Tai, A. Sergienko, M. S. Silverstein, Organic-inorganic networks in foams from high internal phase emulsion polymerizations, Polymer 42 (2001) 4473-4482.
[20] J. Normatov, M. S. Silverstein, Interconnected Silsesquioxane-Organic Networks in Porous Nanocomposites Synthesized within High Internal Phase Emulsions, Chem. Mat. 20 (4) (2008) 1571-1577.
[21] J. Normatov, M. S. Silverstein, Silsesquioxane-Cross-Linked Porous Nanocomposites Synthesized within High Internal Phase Emulsions, Macromolecules 40 (23) (2007) 8329-8335.
[22] S. Livshin, M. S. Silverstein, Crystallinity in Cross-Linked Porous Polymers from High Internal Phase Emulsions, Macromolecules 40 (17) (2007) 6349-6354.
[23] S. Livshin, M. S. Silverstein, Crystallinity and Cross-Linking in Porous Polymers Synthesized from Long Side Chain Monomers through Emulsion Templating, Macromolecules 41 (11) (2008) 3930-3938.
[24] S. Livshin, M. S. Silverstein, Cross-linker flexibility in porous crystalline polymers synthesized from long side-chain monomers through emulsion templating, Soft Matter 4 (8) (2008) 1630-1638.
[25] F. Audouin, M. Birot, E.r. Pasquinet, O. Besnard, P. Palmas, D. Poullain, H. Deleuze, Preparation, Solid-State NMR, and Physicochemical Characterization of Surprisingly Tough Open Cell PolyHIPEs Derived from 1-Vinyl-1,2,4-triazole Oil-in-Water Emulsions, Macromolecules 44 (12) (2011) 4879-4886.
[26] S. Kovačič, M. S. Silverstein, Superabsorbent, High Porosity, PAMPS-based Hydrogels through Emulsion Templating, Macromol. Rapid Commun. 37 (22) (2016) 1814-1819.
[27] S. Zou, Z. Wei, Y. Hu, Y. Deng, Z. Tong, C. Wang, Macroporous antibacterial hydrogels with tunable pore structures fabricated by using Pickering high internal phase emulsions as templates, Polym. Chem. 5 (14) (2014) 4227-4234
[28] N. Cohen, M. S. Silverstein, One-Pot Emulsion-Templated Synthesis of an Elastomer-Filled Hydrogel Framework, Macromolecules 45 (3) (2012) 1612-1621.
[29] P. Lin, S. Ma, X. Wang, F. Zhou, Molecularly Engineered Dual-Crosslinked Hydrogel with Ultrahigh Mechanical Strength, Toughness, and Good Self-Recovery, Adv. Mater. 27 (12) (2015) 2054-2059.
[30] Q. Chen, X. Yan, L. Zhu, H. Chen, B. Jiang, D. Wei, L. Huang, J. Yang, B. Liu, J. Zheng, Improvement of Mechanical Strength and Fatigue Resistance of Double Network Hydrogels by Ionic Coordination Interactions, Chem. Mat. 28 (16) (2016) 5710-5720.
[31] R. D. Harris, J. T. Auletta, S. A. M. Motlagh, M. J. Lawless, N. M. Perri, S. Saxena, L. M. Weiland, D. H. Waldeck, W. W. Clark, T. Y. Meyer, Chemical and Electrochemical Manipulation of Mechanical Properties in Stimuli-Responsive Copper-Cross-Linked Hydrogels, ACS Macro Lett. 2 (12) (2013) 1095-1099.
[32] M. C. Roberts, M. C. Hanson, A. P. Massey, E. A. Karren, P. F. Kiser, Dynamically Restructuring Hydrogel Networks Formed with Reversible Covalent Crosslinks, Adv. Mater. 19 (18) (2007) 2503-2507.
[33] P. Calvo-Marzal, M. P. Delaney, J. T. Auletta, T. Pan, N. M. Perri, L. M. Weiland, D. H. Waldeck, W. W. Clark, T. Y. Meyer, Manipulating Mechanical Properties with Electricity: Electroplastic Elastomer Hydrogels, ACS Macro Lett. 1 (1) (2012) 204-208.
[34] S. Zhou, A. Bismarck, J. H. G. Steinke, Ion-responsive alginate based macroporous injectable hydrogel scaffolds prepared by emulsion templating, J. Mater. Chem. B 1 (37) (2013) 4736-4745.
[35] D. G. Kurth, M. Higuchib, Transition metal ions: weak links for strong polymers, Soft Mater 2 (11) (2006) 915-927.
[36] J. Heine, K. Müller-Buschbaum, Engineering metal-based luminescence in coordination polymers and metal-organic frameworks, Chem. Soc. Rev. 49 (24) (2013) 9232-9242.
[37] S. Y. Zheng, H. Ding, J. Qian, J. Yin, Z. L. Wu, Y. Song, Q. Zheng, Metal-Coordination Complexes Mediated Physical Hydrogels with HIgh Toughness, Stick-Slip Tearing Behavior, and Good Processability, Macromolecules 49 (24) (2016) 9637-9646.
[38] D. Mozhdehi, J. A. Neal, S. C. Grindy, Y. Cordeau, S. Ayala, N. Holten-Andersen, Z. Guan, Tuning Dynamic Mechanical Response in Metallopolymer Networks through Simultaneous Control of Structural and Temporal Properties of the Networks, Macromolecules 49 (17) (2016) 6310-6321.
[39] Z. Tang, J. Huang, B. Guo, L. Zhang, F. Liu, Bioinspired Engineering of Sacrificial Metal-Ligand Bonds into Elastomers with Supramechanical Performance and Adaptive Recovery, Macromolecules 49 (5) (2016) 1781-1789.

[40] B. H. L. Oh, A. Bismarck, M. B. Chan-Park, Injectable, Interconnected, High-Porosity Macroporous Biocompatible Gelatin Scaffolds Made by Surfactant-Free Emulsion Templating, Macromol. Rapid Commun. 36 (4) (2015) 364-372.

[41] M. Costantini, C. Colosi, J. Guzowski, A. Barbetta, J. Jaroszewicz, W. Swieszkowski, M. Dentini, P. Garstecki, Highly ordered and tunable polyHIPEs by using microfluidics, J. Mater. Chem. B 2 (16) (2014) 2290-2300.

[42] M. Ovadia, M. S. Silverstein, High porosity, responsive hydrogel copolymers from emulsion templating, Polym. Int. 65 (3) (2016) 280-289.

[43] L. J. Kirwan, P. D. Fawell, W.v. Bronswijk, In Situ FTIR-ATR Examination of Poly(acrylic acid) Adsorbed onto Hematite at Low pH, Langmuir 19 (14) (2003) 5802-5807.

[44] B. George, V. N. R. Pillai, B. Mathew, Effect of the Nature of the Crosslinking Agent on the Metal-Ion Complexation Characteristics of 4 Mol % DVB- and NNMBA-Crosslinked Polyacrylamide-Supported Glycines, J. Appl. Polym. Sci. 74 (14) (1999) 3432-3444.

[45] D. Li, S. Zhu, R. H. Pelton, Preparation and characterization of graft copolymers of polyacrylamide and polyethylenimine, Eur. Polym. J 34 (8) (1998) 1199-1205.

[46] G. B. Deacon, R. J. Phillips, Relationships between the carbon-oxygen stretching frequencies of carboxylato complexes and the type of carboxylate coordination, Coord. Chem. Rev. 33 (3) (1980) 227-250.

[47] F. Peng, G. Li, X. Liu, S. Wu, Z. Tong, Redox-Responsive Gel-Sol/Sol-Gel Transition in Poly(acrylic acid) Aqueous Solution Containing Fe(III) Ions Switched by Light, J. Am. Chem. Soc. 130 (48) (2008) 16166-16167.

[48] T. Zhang, Q. Guo, Isorefractive high internal phase emulsion organogels for light induced reactions, Chem. Commun. 52 (24) (2016) 4561-4564.

[49] P. Hainey, I. M. Huxham, B. Rowatt, D. C. Sherrington, Synthesis and Ultrastructural Studies, of Styrene-Divinylbenzene Polyhipe Polymers, Macromolecules 24 (1) (1991) 117-121.

[50] L. L. Wong, V. O. Ikem, A. Menner, A. Bismarck, Macroporous Polymers with Hierarchical Pore Structure from Emulsion Templates Stabilised by Both Particles and Surfactants, Macromol. Rapid Commun. 32 (19) (2011) 1563-1568.

[51] C. Chang, M. He, J. Zhou, L. Zhang, Swelling Behaviors of pH- and Salt-Responsive Cellulose-Based Hydrogels, Macromolecules 44 (6) (2011) 1642-1648.

[52] R. M. Fuoss, Polyelectrolytes, Discuss. Faraday Soc. 11 (1951) 125-134.

[53] J. Normatov, M. S. Silverstein, Porous interpenetrating network hybrids synthesized within high internal phase emulsions, Polymer 48 (22) (2007) 6648-6655.

[54] Q. Li, D. G. Barrett, P. B. Messersmith, N. Holten-Andersen, Controlling Hydrogel Mechanics via Bio-Inspired Polymer-Nanoparticle Bond Dynamics, ACS Nano 10 (1) (2016) 1317-1324.

[55] X. Le, W. Lu, J. Zheng, D. Tong, N. Zhao, C. Ma, H. Xiao, J. Zhang, Y. Huang, T. Chen, Stretchable supramolecular hydrogels with triple shape memory effect, Chem. Sci. 7 (11) (2016) 6715-6720.

[56] I. Gurevitch, M. S. Silverstein, Shape memory polymer foams from emulsion templating, Soft Matter 8 (40) (2012) 10378-10387.

[57] T. Spychaj, B. Schmidt, Polymeric systems based on poly(acrylic acid) and trivalent metal cations, Macromol. Symp. 152 (1) (2000) 173-189.

What is claimed is:

1. A composition-of-matter comprising a continuous HIPE-templated doubly-crosslinked hydrogel, said hydrogel comprises a swelling medium, at least one coordinative metal atom or ion thereof, and a fixed-crosslinked polymer that comprises a plurality of residues of at least one hydrogel-forming monomer, a plurality of residues of at least one ligand-bearing monomer, a plurality of residues of at least one crosslinking monomer, wherein:
   each of said ligand-bearing monomers exhibits at least one metal coordinative ligand, capable of forming metal coordination bonding with said coordinative metal atom or ion thereof;
   said polymer comprises at least 0.1 wt. % of said plurality of residues of said at least one ligand-bearing monomer;
   said polymer is characterized by a fixed-crosslinking level of at least 0.1 wt. %;
   said hydrogel comprises at least or up to a non-washable amount of said coordinative metal or ion thereof, and
   the composition-of-matter is essentially devoid of a polysaccharide.

2. The composition-of-matter of claim 1, wherein at least 1% of said coordinative metal or ion thereof is removably attached to at least two of said plurality of residues of said at least one ligand-bearing monomer via reversible metal-coordination bonding.

3. The composition-of-matter of claim 2, characterized by a modulus of at least 50 kPa when fully swollen with an aqueous media or water.

4. The composition-of-matter of claim 3, wherein said polymer is characterized by a modulus of less than 40 kPa when fully swollen with an aqueous media or water and essentially devoid of said plurality of at least one coordinative metal atom or ion thereof.

5. The composition-of-matter of claim 1, characterized by a metal responsive volumetric shrinkage is lower than about 30%.

6. The composition-of-matter of claim 1, wherein said coordinative metal is a transition metal selected from the group consisting of Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Hg, Ac, Rf, Db, Sg, Bh, Hs, Mt, Ds, Rg, and Cn.

7. The composition-of-matter of claim 6, wherein said coordinative metal is an ion selected from the group consisting of $Zn^{2+}$, $Cu^{2+}$, $Co^{2+}$ and $Fe^{+3}$.

8. The composition-of-matter of claim 1, wherein said hydrogel-forming monomer is selected from the group consisting of acrylamide, hydroxyethyl methacrylate, hydroxyethyl acrylate, acrylic acid, methacrylic acid, styrene sulfonate, and combinations thereof.

9. The composition-of-matter of claim 8, wherein said hydrogel-forming monomer is acrylamide.

10. The composition-of-matter of claim 1, wherein said ligand-bearing monomer is selected from the group consisting of sodium acrylate, sodium methacrylate, sodium 2-acrylamido-2-methyl-1-propanesulfonic acid, sodium 4-styrenesulfonate, 1-vinylimidazole, 1-imidazol-1-yl-2-methylprop-2-en-1-one, and 2-(methacryloyloxy)ethyl 1H-imidazole-1-carboxylate, and any combination thereof.

11. The composition-of-matter of claim 10, wherein said ligand-bearing monomer is sodium acrylate and/or 1-vinylimidazole.

12. A process of manufacturing the composition-of-matter of claim 1, comprising:

soaking said hydrogel in a metal-charging solution to thereby form said metal coordination bonding and obtain said doubly-crosslinked hydrogel, and washing said doubly-crosslinked hydrogel with a metal-washing solution, to thereby remove washable unbound coordinative metal or ion thereof and obtain the composition-of-matter.

13. The process of claim 12, further comprising, prior to said soaking, synthesizing said hydrogel.

14. An article-of-manufacturing, comprising the composition-of-matter of claim 1.

15. The article-of-manufacturing of claim 14, selected from the group consisting of a shape-memory hydrogel, a water-uptake hydrogel, a metal atom/ion extracting hydrogel, and ion exchange substance.

\* \* \* \* \*